US007847240B2

(12) United States Patent
Reinhold

(10) Patent No.: US 7,847,240 B2
(45) Date of Patent: Dec. 7, 2010

(54) MASS SPECTROSCOPY SYSTEM AND METHOD INCLUDING AN EXCITATION GATE

(75) Inventor: Bruce Reinhold, Sudbury, MA (US)

(73) Assignee: Dana-Farber Cancer Institute, Inc., Boston, MA (US)

( * ) Notice: Subject to any disclaimer, the term of this patent is extended or adjusted under 35 U.S.C. 154(b) by 428 days.

(21) Appl. No.: 12/133,883

(22) Filed: Jun. 5, 2008

(65) Prior Publication Data

US 2009/0008543 A1 Jan. 8, 2009

Related U.S. Application Data

(60) Provisional application No. 60/943,205, filed on Jun. 11, 2007.

(51) Int. Cl.
*B01D 59/44* (2006.01)
*G01N 23/00* (2006.01)
*H01J 49/42* (2006.01)

(52) U.S. Cl. ........................ 250/282; 250/281; 250/288

(58) Field of Classification Search ................. 250/281, 250/282, 287, 288, 290, 292, 293, 307
See application file for complete search history.

(56) References Cited

U.S. PATENT DOCUMENTS

| | | | | |
|---|---|---|---|---|
| 4,540,884 | A | 9/1985 | Stafford et al. | |
| 4,982,088 | A | 1/1991 | Weitekamp et al. | |
| RE34,000 | E | 7/1992 | Syka et al. | |
| 5,179,278 | A | 1/1993 | Douglas | |
| 5,420,425 | A | 5/1995 | Bier et al. | |
| 5,420,549 | A | 5/1995 | Prestage | |
| 5,517,025 | A | 5/1996 | Wells et al. | |
| 6,177,668 | B1 | 1/2001 | Hager | |
| 6,483,109 | B1 * | 11/2002 | Reinhold et al. | 250/292 |
| 7,071,464 | B2 * | 7/2006 | Reinhold | 250/282 |
| 2003/0132380 | A1 * | 7/2003 | Miller et al. | 250/286 |
| 2004/0011956 | A1 * | 1/2004 | Londry et al. | 250/292 |
| 2004/0222369 | A1 | 11/2004 | Makarov et al. | |
| 2004/0245455 | A1 * | 12/2004 | Reinhold | 250/288 |
| 2007/0012005 | A1 | 1/2007 | Huang | |
| 2007/0181804 | A1 | 8/2007 | Hashimoto et al. | |

FOREIGN PATENT DOCUMENTS

| | | |
|---|---|---|
| WO | WO 01/15201 | 3/2001 |
| WO | WO 2007/052372 | 5/2007 |
| WO | WO 2007/062498 | 6/2007 |

OTHER PUBLICATIONS

Prestage et al., "New ion trap for frequency standard applications," *J. Applied Phys.*, 66:1013-1017 (1989).

Raizen et al., "Ionic crystals in a linear Paul trap," *Phys. Rev. A*, 45:6493-6501 (1992).

Zhong et al., "Genome-wide characterization of a viral cytotoxic T lymphocyte epitope repertoire," *J. Biol. Chem.*, 278:45135-45144 (2003).

* cited by examiner

*Primary Examiner*—Bernard E Souw
(74) *Attorney, Agent, or Firm*—Fish & Richardson P.C.

(57) ABSTRACT

An ion extraction method and system includes: i) confining ions within an ion trap extending along a longitudinal axis; ii) exciting a subset of the ions to cause them to oscillate along at least one transverse coordinate; iii) after the transverse excitation, applying a first field and a second field in the region of the transverse excitation to move the excited ions towards one end of the ion trap and extract at least some of the excited ions at the end of the ion trap.

54 Claims, 13 Drawing Sheets

210

220

MASS SPECTROSCOPY SYSTEM AND METHOD INCLUDING AN EXCITATION GATE

CROSS-REFERENCE TO RELATED APPLICATIONS

This application claims priority to U.S. Provisional Patent Application Ser. No. 60/943,205, filed Jun. 11, 2007, the contents of which are incorporated herein by reference.

TECHNICAL FIELD

The invention relates to a mass spectroscopy system and method.

BACKGROUND

Mass spectroscopy is an analytical technique used to identify the mass-to-charge (m/Z) ratio of ions and ion fragments produced when a sample is ionized and parent ions are sufficiently energized to fragment. Identifying the mass-to-charge ratio of the ion fragments provides information about the parent ion. Mass spectroscopy systems use electric and/or magnetic fields to guide the ions fragments along trajectories that depend on their mass-to-charge ratios. Many systems include "ion guides" and "ion traps," in which the ion trajectories are stable along some or all coordinate directions only for a selected range of mass-to-charge ratios.

Many ion traps, such as quadrupole ion traps, apply a combination of radio-frequency (RF) and direct-current (DC) voltages to electrodes to form the trapping fields. The relative magnitude of the RF and DC voltages determine the range of mass-to-charge ratios that correspond to stable trajectories. Those ions that are stable undergo oscillations within the trap at frequencies that depend on their mass-to-charge ratio. In some cases, the ion trap may further apply an alternating-current (AC) voltage to the electrodes to induce resonant excitation of a selected subset of the trapped ions, for the purpose of either inducing collisions that dissociate those ions or ejecting them from the trap.

One common ion trap configuration is a three-dimensional quadrupole trap (3D-IT), which involves a ring electrode and two end cap electrodes. Most commonly, an RF potential is applied to the ring electrode with the end cap electrodes held at ground to generate the trapping fields. Another configuration is a linear ion trap (LIT), which involves an extended set of electrodes to transversely confine ions and electrostatic "plugs" at opposite ends of the trap to axially confine the ions. RF potentials are applied to the extended set of electrodes to generate quadrupole-type trapping fields along the transverse coordinates and DC potentials at the ends to prevent ions from diffusing out either end of the trap. The volume in which the ions are significantly influenced by the DC end potentials is generally a small fraction of the volume ions occupy in the LIT so that the ion's trapping motion is described by the transverse coordinates alone and the LIT is therefore also denoted a two-dimensional ion trap. Combining the transverse RF quadrupolar potential with an additional DC potential that is applied between electrodes in different axial regions to produce a static harmonic trapping potential along the axial coordinate generates another three-dimensional trap, referred to as a harmonic linear trap (HLT). Examples of prior art for the HLT are Prestage et al., J. Applied Phys. 66, 1013 (1989) and Raizen et al., Phys. Rev. A 45, 6493 (1992). As a technical aside, almost all physical LITs are in fact HLTs with very weak quadratic potentials. Details of such radio-frequency ion traps are well known in the art. See, for example, U.S. Pat. No. 4,540,884 to Stafford et al., U.S. Pat. No. 5,420,425 to Bier et al., and U.S. Pat. No. 5,179,278 to Douglas.

Furthermore, many mass spectroscopy systems are hybrids in which ion guides and ion traps are arranged to transfer ions between themselves and to other mass analysis devices such as time-of-flight (TOF), Fourier transform ion cyclotron resonance (FT-ICR) or electrostatic (e.g., "Orbitrap") mass spectrometers. Components of hybrid systems may offer different functionality in the overall molecular analysis, for example, an ion guide may accumulate ions, and an ion trap may isolate and fragment ions, while a TOF or other mass analysis device may provide high resolution m/Z measurements.

To provide additional information about a parent ion, it may be preferable to perform multiple stages of isolating ions having a selected mass-to-charge ratio and fragmenting those ions. For example, a first stage of mass spectrometry may be used to select a primary ion of interest, for example, a molecular ion of a particular biomolecular compound such as a peptide, and that ion is caused to fragment by increasing its internal energy, for example, by colliding the ion with a neutral molecule. A second stage of mass spectrometry may then be used to analyze the mass-to-charge ratios of the fragment ions. Often the structure of the primary ion can be determined by interpreting the fragmentation pattern. This process is typically referred to as an MS/MS or MS(2) analysis. The MS/MS analysis improves the recognition of a compound with a known pattern of fragmentation and also improves specificity of detection in complex mixtures, where different components give overlapping peaks in a single stage of MS. Further information about the parent ion may be determined by implementing additional stages of mass-to-charge isolation and fragmentation, something that is typically referred to as MS(N) analysis.

In most MS(N>1) systems, a specific ion fragment is first isolated by ejecting all other ion fragment m/Z values and the isolated ion is then induced to fragment. The ejection of ions or ion fragments that are not being selected at a particular stage of the MS(N) analysis results in a loss of sensitivity or a loss of information which may otherwise be derived from the ejected ion fragments. To retain ion fragments not selected at a particular stage of the MS(N) analysis for use at other stages of the MS(N) analysis, a multiple stage mass spectrometer may be used. Such a spectrometer is described in PCT Publication WO 01/15201 A2 and U.S. Pat. No. 6,483,109 by Reinhold and Verentchikov, and U.S. Pat. No. 7,071,464 by Reinhold, the contents of which are incorporated herein by reference. These documents disclose different dynamical methods for selecting an ion for fragmentation by m/Z-selective transfer from a population of trapped ions such that both the ions transferred and the ions not transferred remain available for fragmentation analyses.

U.S. Pat. No. 7,071,464 teaches that one class of methods for selective transfer involves generating spatially localized modifications in an axially extended trapping field. These field modifications generate axial forces on the ion which increase with the amplitude of the ion's transverse oscillation and vanish for ions with no transverse amplitude. Combining the field modifications with a static DC potential to block unexcited ions creates a region of the axially extended RF trapping field which selectively transmits ions with transverse oscillation amplitude. This region was denoted an excitation gate. U.S. Pat. No. 7,071,464 discloses a method of m/Z-selection in which resonance excitation at specific frequencies selectively increases the transverse oscillation amplitude of a subset of the confined ions in a linear ion trap region displaced from the excitation gate. The entire ion population is then directed into the excitation gate and the subset of ions that were transversely excited pass through the gate while unexcited ions are blocked. The combination of a linear ion trap (LIT) region and localized field modification or excitation gate will herein be referenced as an excitation gate trap (EGT).

The EGT described could be a component of many hybrid MS systems. For example, in a quadrupole-TOF system (an MS/MS system consisting of an ion source, a quadrupole mass filter, a collision cell and a TOF mass analyzer) an EGT could replace the mass filter. Selected ions from an ion ensemble accumulated in the LIT would be resonance excited and then directed to transfer through the excitation gate and accelerated into the collision cell. These ions would fragment and the fragments would be mass-analyzed by the TOF (in the same manner as with current quadrupole-TOF instruments). Ions not resonance excited remain trapped for subsequent excitation and transfer. The advantage of using the excitation gate as opposed to a mass filter for m/Z selection is sensitivity. The transfer of ions in a limited m/Z range leaves the rest of the trapped ions in the LIT available for subsequent transfer and MS(2) analysis. In contrast, when the mass filter transmits a limited m/Z range from an ion beam to the collision cell the ions not transmitted are lost to unstable trajectories. If ions in the incident flux can be accumulated in the EGT and multiple components selectively MS(2) analyzed, one would be able to MS(2) analyze ions with the EGT that are currently ejected with the mass filter. In this application a technical challenge is to make the EGT operate with the highest possible incident flux of ions from the ion source.

SUMMARY

Disclosed is a system and method for rapid m/Z-selective transfer from an ensemble of stored ions. The transfer may be for multiple purposes: for editing the stored ion population by removing unwanted ions; for isolating ions in an m/Z window for fragmentation analysis or spectroscopic characterization; for chemical reaction; for physical recovery of a molecular species; for ion detection. Ions transferred have phase space distributions appropriate for collisional activation and fragmentation analysis in an axially aligned ion trapping region or collision cell. The ions not selected are minimally disturbed by the transfer of selected ions and remain trapped for subsequent transfer and analysis. The disclosed embodiments improve methods and systems for operating an excitation gate as described in U.S. Pat. No. 7,071,464.

We now summarize particular aspects and features.

In general, in one aspect, an ion extraction method is disclosed that includes: i) confining ions within an ion trap extending along a longitudinal axis; ii) exciting a subset of the ions to cause them to oscillate along at least one transverse coordinate; iii) after the transverse excitation, applying a first field in the region of the transverse excitation to move the excited ions towards one end of the ion trap, wherein the first field is configured to produce an axial force that varies with the amplitude of the transverse oscillation of the excited ions and produces substantially no axial force for unexcited ions located along the longitudinal axis; and iv) providing a second field different from the first field to extract at least some of the excited ions through a potential barrier at the end of the ion trap, wherein the second field is configured to provide an axial force whose magnitude varies with the transverse excitation energy of the excited ions and produces substantially no axial force for unexcited ions located along the longitudinal axis.

The method may include any of the following features:

The first field can be a DC electric field.

The second field can be a DC electric field.

The first and second fields can be applied at the same time.

The first field can be applied in a first longitudinal portion of the ion trap to move excited ions in the first longitudinal portion of the ion trap toward a second longitudinal portion of the ion trap, and wherein the second field is applied in the second longitudinal portion of the ion trap to transfer ions from the first longitudinal portion through the potential barrier at the end of the ion trap corresponding to a third longitudinal portion of the ion trap.

The axial energy of ions incident on the potential barrier at the end of the trap depends on the ion's axial position in the trap at the time the first and second fields are applied, the amplitude of its transverse oscillation at the time the first and second electric fields are applied, and the longitudinal component of the first and second fields in the region containing the ion trajectories. The first and second fields can be configured so that axial energy acquired by the excited ions moving from first longitudinal portion to the second longitudinal portion is smaller than axial energy that is acquired by these same excited ion moving through the second longitudinal portion of the ion trap.

The method can further include, after the transverse excitation, applying a third field to transfer at least some of the excited ions through an intermediate potential barrier in the ion trap to a region of the second field, wherein the third field is configured to provide an axial force whose magnitude varies with the transverse excitation energy of the excited ions and produces substantially no axial force for unexcited ions located along the longitudinal axis. For example, the first, second, and third fields can be electric fields.

The first field can be applied in a first longitudinal portion of the ion trap to move excited ions in the first longitudinal portion of the ion trap toward a second longitudinal portion of the ion trap including the intermediate potential barrier, and wherein the third field is applied in the second longitudinal portion of the ion trap to transfer ions from the first longitudinal portion through the intermediate potential barrier in the second longitudinal portion to a third longitudinal portion of the ion trap. For example, the second field can be applied to transfer ions from the third longitudinal portion through the potential barrier at the end of the ion trap. The transverse excitation of the excited ions can be caused by a transverse excitation field applied in the first longitudinal region.

The axial energy of ions incident on the intermediate potential barrier depends on the ion's axial position in the trap at the time the first and third fields are applied, the amplitude of its transverse oscillation at the time the first and third electric fields are applied, and the longitudinal component of the first and third fields in the region containing the ion trajectories. For example, the first, second, and third fields can be configured so that axial energy acquired by the excited ions moving through the first and second longitudinal portions is smaller than axial energy that is acquired by these same excited ion moving through the third longitudinal portion of the ion trap.

In some embodiments, he first and third fields can be DC electric fields applied at the same time. In some embodiments, the second field can be applied at the same time as the first and third fields. The second field can also be a DC electric field.

Alternatively, in some embodiments, the second field can be produced by axially localized spatial modifications to an RF-trapping field used to transversely confine the ions in the ion trap. For example, the axially localized spatial modifications to the RF trapping field can include a localized axial gradient of the RF electric field. For example, the longitudinally localized spatial modification can include a change in geometry of one or more extended RF electrodes used to generate the RF trapping field. For example, the RF electrodes can include rods and the change in geometry can include a change in the diameter of the rods. For example, the change in the diameter of the rods can include a thinning of the rod diameters in the direction of the potential barrier at the end of the trap. Alternatively, the RF electrodes can include plates and the change in geometry can include one or more holes in the RF electrodes.

The confined ions can have a mass-to-charge ratio within a specified range.

Confining of the ions can include generating electric fields within the ion trap. The confining electric fields can be produced by a superposition of fields generated by one or more sets of electrodes. For example, a first time-dependent electric field transversely can confine ions by generating a time-dependent linear restoring force along the transverse coordinate plane with respect to the longitudinal axis (z) of the form $$\begin{pmatrix} a_{11}(t) & a_{12}(t) \\ a_{21}(t) & a_{22}(t) \end{pmatrix} \begin{pmatrix} x \\ y \end{pmatrix},$$

where x and y denote transverse coordinates, t denotes time, and where $a_{ij}(t)=a_{ij}(t+T)$ for some time interval T; and wherein a second DC electric field can longitudinally confine ions by producing potential barriers at the entrance and exit ends of the extended ion trap.

The exciting of the subset of ions can include generating a time-dependent electric field along the transverse coordinate to resonantly excite confined ions having a selected range of mass-to-charge ratio. For example, a trajectory of each of the confined ions can define a frequency spectrum for each transverse coordinate and each spectrum includes at least one spectral peak at a frequency $\omega_{j,(m/Z)}$ that varies with the mass-to-charge ratio m/Z of the confined ion, wherein the index j denotes a particular one of the transverse coordinates, and wherein the exciting of the subset of ions can include generating the time-dependent excitation electric field along the transverse coordinate to have spectral intensity at the transverse spectral peak frequency corresponding to the selected range of mass-to-charge ratio.

In embodiments with the two applied fields, the response of the confined ions to the time-dependent electric field can include a resonant response, wherein ions having a mass-to-charge ratio in the selected range acquire a transverse oscillation magnitude greater than a cutoff value and a non-resonant response, wherein ions having a mass-to-charge ratio away from the selected range acquire an oscillation magnitude that is less than the cutoff value. For example, the non-resonant response might have transverse oscillation amplitude with a maximum kinetic energy that is less than 10% of the resonant response. The ions moved by the first field and extracted by the second field include ions with the resonant response and not ions the non-resonant response.

In embodiments with the three applied fields, the response of the confined ions to the transverse excitation can includes a resonant response, wherein ions having a mass-to-charge ratio in the selected range acquire a transverse oscillation magnitude greater than a first cutoff value, a nearly resonant response, wherein ions having a mass-to-charge ratio close to the selected range acquire a transverse oscillation magnitude greater than a second cutoff value but less than the first cut-off value, and a non-resonant response, wherein ions having a mass-to-charge ratio away from the selected range acquire an oscillation magnitude that is less than the second cutoff value. For example, the non-resonant response might have transverse oscillation amplitude with a maximum kinetic energy that is less than 10% of the maximum kinetic energy of the resonant response, and the nearly resonant response might have transverse oscillation amplitude with a maximum kinetic energy that is less than 75% of maximum kinetic energy of the resonant response. The first, second, and third fields can be configured such that the ions having the resonant response pass through the intermediate potential barrier and the potential barrier at the end of the ion trap, the ions having the nearly resonant response pass through the intermediate potential barrier but not the potential barrier at the end of the ion trap, and the ions having the non-resonant response do not pass through the intermediate potential barrier to even reach the potential barrier at the end of the trap.

The first field can be a DC electric field that has a longitudinal field component that vanishes on the longitudinal axis and increases in magnitude with transverse displacement from the longitudinal axis along at least one transverse direction. For example, the longitudinal components of the first DC electric field to axially accelerate the excited ions can be applied using DC electrodes. For example, the DC electrodes include electrodes surrounding the longitudinal axis and alternating with RF electrodes used to generate an extended RF trapping field for transversely confining the ions in the ion trap. The DC electrodes can include electrodes bisecting the space between the RF electrodes and aligned so as to lie on a zero potential nodal plane between the RF electrodes. The DC electrodes can be segmented along the longitudinal axis for generating a longitudinal component of the electric field.

The second field can be a DC electric field that has a longitudinal field component that vanishes on the longitudinal axis and increases in magnitude with transverse displacement from the longitudinal axis along at least one transverse direction. For example, the longitudinal components of the second DC electric field to axially accelerate the excited ions can be applied using DC electrodes. For example, the DC electrodes can include electrodes surrounding the longitudinal axis and alternating with RF electrodes used to generate an extended RF trapping field for transversely confining the ions in the ion trap. The DC electrodes can include electrodes bisecting the space between the RF electrodes and aligned so as to lie on a zero potential nodal plane between the RF electrodes. The DC electrodes can be segmented along the longitudinal axis for generating a longitudinal component of the electric field.

The third field can be a DC electric field that has a longitudinal field component that vanishes on the longitudinal axis and increases in magnitude with transverse displacement from the longitudinal axis along at least one transverse direction. The longitudinal components of the third DC electric field to axially accelerate the excited ions are applied using DC electrodes. The DC electrodes can include electrodes surrounding the longitudinal axis and alternating with RF electrodes used to generate an extended RF trapping field for transversely confining the ions in the ion trap. The DC electrodes can include electrodes bisecting the space between the RF electrodes and aligned so as to lie on a zero potential nodal plane between the RF electrodes. The DC electrodes can be segmented along the longitudinal axis for generating a longitudinal component of the electric field.

In general, the ion trap can include RF electrodes surrounding the longitudinal axis and configured to produce an RF trapping field to transversely confine the ions in the ion trap. The ion trap can further includes an extended array of segmented DC plate electrodes that surround the longitudinal axis and alternate with the RF electrodes.

In another aspect, an ion trap apparatus is disclosed including: electrodes configured to generate a trapping field to transversely confine ions with respect to a longitudinal axis and to further generate additional fields for manipulating the confined ions; a power supply system coupled to the electrodes for generating the fields; and an electronic controller coupled to the power supply system. The electronic controller is configured to cause the power supply system to cause the electrodes to: i) excite a subset of the ions to cause them to oscillate along at least one transverse coordinate; ii) after the transverse excitation, apply a first field in the region of the transverse excitation to move the excited ions towards one end of the ion trap, wherein the first field is configured to produce an axial force that varies with the amplitude of the transverse oscillation of the excited ions and produces substantially no axial force for unexcited ions located along the longitudinal axis; and iii) provide a second field different from the first field to extract at least some of the excited ions through a potential barrier at the end of the ion trap, wherein the second field is configured to provide an axial force whose magnitude varies with the transverse excitation energy of the excited ions and produces substantially no axial force for unexcited ions located along the longitudinal axis.

Embodiments of the apparatus may include any of the features described above in connection with the method. For example, the electronic controller can be further configured to cause the power supply system to cause the electrodes to implement any of the features described above in connection with the method. Furthermore, the electrodes and power supply system can be configured in the manner corresponding to any of the method features described above. For example, the power supply system can include a set of power supplies for causing the electrodes to generate AC, DC, and RF fields. The electrodes can include an extended array of segmented plate electrodes alternating with RF electrodes and surrounding the longitudinal axis.

Unless otherwise defined, all technical and scientific terms used herein have the same meaning as commonly understood by one of ordinary skill in the art to which this invention belongs. In case of conflict with publications, patent applications, patents, and other references incorporated herein by reference, the present specification, including definitions, will control.

The details of one or more embodiments of the invention are set forth in the accompanying drawings and the description below. Other features, objects, and advantages of the invention will be apparent from the description and drawings, and from the claims.

DESCRIPTION OF DRAWINGS

The invention will now be further described merely by way of example with reference to the accompanying drawings in which:

FIG. 6*a* is a perspective view, FIG. 6*b* is a cross-section view, and FIG. 6*c* is a side view.

FIG. 7*a* shows a voltage setting for a quadrupole field with no on-axis potential, FIG. 7*b* shows a voltage setting for an on-axis potential barrier, and FIG. 7*c* shows a voltage setting for use with time-varying transverse excitation of the confined ions.

FIG. 8*a* is a cross-section view and FIG. 8*b* is a perspective view showing potential field lines.

Like reference symbols in the various drawings indicate like elements.

DETAILED DESCRIPTION

MS(N) mass spectrometry considers the sequential disassembly of multiple ions while retaining multiple branches of the fragmentation tree. See, for example, PCT Publication WO 01/15201 A2 and U.S. Pat. No. 6,483,109 by Reinhold and Verentchikov, and U.S. Pat. No. 7,071,464 by Reinhold, of which are incorporated herein by reference.

Figure 1:
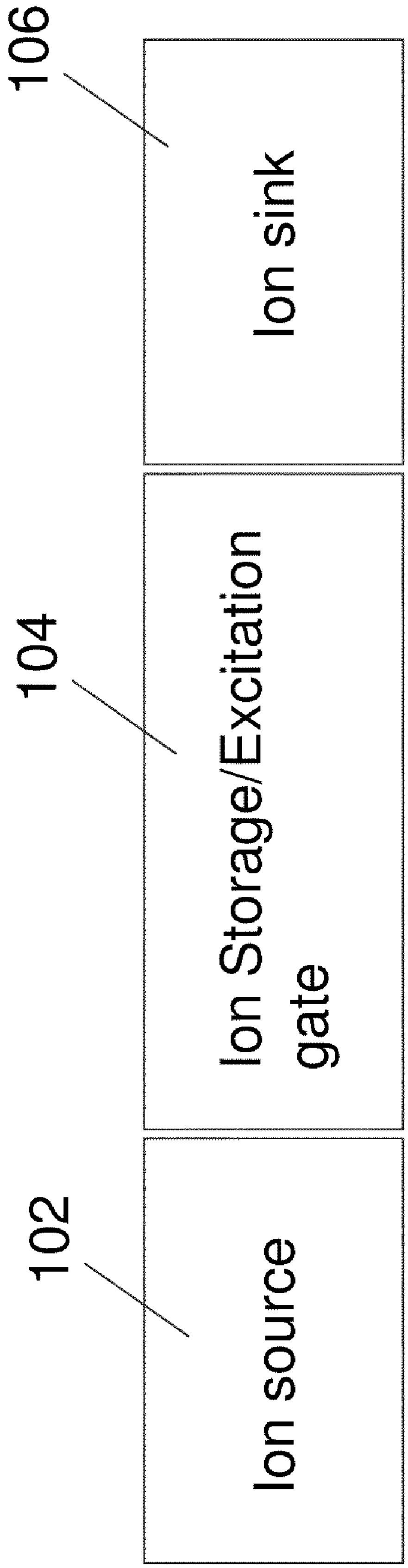
FIG. 1 is a schematic diagram of an excitation gate as a mass-selective transfer device coupling an ion source with an ion sink.

FIG. 1 depicts a logical diagram of the excitation gate 104 as a mass-selective transfer device that couples an ion source 102 (e.g., an ion trap, ion guide, and/or ionization device) with an ion sink 106 (e.g., collision cell, another excitation gate, ion trap, ion guide and/or mass analysis device). A series of axially aligned EGTs could serve as all, or part, of an MS(N) molecular detector.

For example, a parent m/Z range is transferred by a first EGT, collisionally dissociated, and stored in a second EGT. The dissociation could be in a high pressure collision cell inserted between the EGTs using a DC offset or in the excitation volume of the 2nd EGT using resonance excitation. MS(2) fragments are in turn transferred, dissociated, and stored in a third excitation gate. At some point selected MS(N) fragments are transferred to an ion detector and measured. The generation of multiple MS(N) fragments from a single parent m/Z places great importance on the flux by which ions can be processed through the MS(N) hierarchy. The processing flux is a product of the number of ions analyzed per selection step and the rate at which the selection steps can be executed. The number of ions analyzed per step is limited by the charge capacity for resonance excitation in the excitation volume. A number of technical and cost factors offset increasing charge capacity. A longer excitation region tends to increase the charge capacity but places high tolerance in the parallel alignment of the trapping electrodes to maintain a sharp resonance frequency for a given m/Z. Longer excitation regions also increase the difficulty in rapid extraction of ions after transverse excitation. The selection rate is determined by nature of the excitation, transfer and cooling dynamics.

As described above, an EGT involves an m/Z-selection in which resonance excitation at specific frequencies selectively increases the transverse oscillation amplitude of a subset of the confined ions in a linear ion trap region displaced from the excitation gate. The entire ion population is then directed into the excitation gate and the subset of ions that were transversely excited pass through the gate while unexcited ions are blocked. However, in the region having an axial gradient in the trapping field the ion's transverse resonance frequency is dependent on axial position. Therefore the ions are first excited in a region away from the gate, and after this transverse excitation, the entire ion population is moved into the gate region for the difference in transverse oscillation amplitude to translate into a difference in axial force. Passive diffusion to transfer ions from the excitation region to the gate region is generally too slow for most analyses, and so actively pushing the ions to the gate region is desirable. In embodiments of U.S. Pat. No. 7,071,464, DC voltages are applied to electrodes to rapidly push ions from the excitation region into the gate region. The applied DC voltages ('a DC offset ramp') generate an axial potential gradient or electric force directed along the axial direction that does not vanish on the center axis and therefore pushes all ions in the excitation region into the gate.

The time between subsequent m/Z-selective transfers from a single confined ion population includes not just the resonant excitation time and the time for the ions to be directed out of the excitation region and into the gate region, but also the time required for the ions not selected to be prepared for the transfer of a different m/Z window. Here the axial momentum acquired by a second set of ions in transferring the first set of ions limits the rate at which subsequent m/Z windows can be transferred. Depending on the ion's position and momentum, applying the extraction and transfer potentials to specific electrodes can either accelerate or decelerate the axial motion of the second set of ions. Repeated application of the potentials associated with multiple transfers from an original confined ion population may result in axial excitation and transfer of ions through the axial DC block that have not been selected by resonance excitation. The excitation gate would lose m/Z selectivity. On the other hand, waiting for the axial motion to dissipate through collisions with background neutrals slows the rate of successive ion transfers.

A general problem with the excitation gate as embodied in U.S. Pat. No. 7,071,464, therefore, is that the spatial separation between the excitation gate and the excitation region requires the axial transfer of ions from the excitation region to the gate region after resonance excitation. Using a DC ramp to direct the ion population into the excitation gate region results in axial acceleration of all the ions and the resulting axial motion is a problem in subsequent m/Z-selective transfers.

The differences in transverse oscillation amplitude that arise from the resonance excitation step are transformed into differences in axial momentum by the radial/axial coupling fields; however, these differences are set against a stochastic background of axial momenta due to thermal and positional factors. A general concern with ion selection for fragmentation is to avoid collisional dissociation as a consequence of the selection dynamics. In many embodiments of an EGT it might be desirable to operate at higher pressures with heavier neutrals. Collisional heating and ion fragmentation during selective transfer can be a problem. It is generally desirable to limit the transverse oscillation amplitude given to the ions and yet maintain the axial energy discrimination between different m/Z for ions incident on the downstream potential barrier. Therefore a general criterion of radial/axial coupling by gradient fields is the axial force associated with a degree of radial excitation.

A greater axial force for a fixed amplitude of radial excitation leads to higher selection resolution and to obtain a larger axial forces requires the excitation gate region exhibit larger axial field gradients. It is generally desirable to keep non resonant ions out of this region. First, and simply, ions should be returned to the excitation region of the EGT if they are to be selected in subsequent m/Z transfers and this takes additional time. As thermal motion pushes ions into regions of a softened RF quadrupolar field, there may be substantial accumulation in a gate region that is created by a localized decrease in RF amplitude. Second, ions in a region with high axial field gradients will convert stochastic radial amplitude driven by collisions into axial motion adding further spread to the ion's axial background momenta. Third, limited motional stability in the gate region can result in ion loss. For example, if the isolation function and the m/Z selection function are shared by a single blocking potential, then all ions are to be directed toward the gate with enough axial translational energy to pass through the first (isolating) part of the blocking potential and into the region where the axial gradient field couples with the selected ion's radial amplitude and thereby drives the selected ions over the second (selecting) part of the blocking potential. The ions that do not transfer through the second (selecting) part of the blocking potential rapidly reflect, but with an axial energy that is a problem in transfer of subsequent m/Z windows.

In EGT embodiments disclosed herein, m/Z-selective transfer is enhanced by combining dynamically applied axial gradient fields with static (in axial position) gradient fields after the transverse excitation step. The combination of axial gradient fields serves to extract ions from the excitation region, push a subset of these ions through a first isolating potential and then push a subset of these ions through a second (high resolution) selecting potential. For high resolution m/Z-selection in an EGT the axial energy acquired by ions through radial/axial coupling should be dominated by the oscillation amplitude acquired in the transverse excitation step. This requires the dominant component of the radial/axial coupling be downstream of the excitation region and localized in the excitation gate region. Otherwise the axial energy acquired by ions will reflect their axial position in the excitation region. As the ions are extracted from the excitation region they enter a region where higher amplitude radial/axial coupling fields are dynamically applied. This is associated with a blocking potential that prevents ions with stochastic background axial momenta (roughly thermal) and little radial amplitude from entering the third region, where the coupling fields are of the highest amplitude. As this third region is isolated from the excitation volume and will not, therefore, perturb the resonance frequencies these coupling fields may be established in a static manner. Separating the isolating gate region from the selecting gate region allows the non resonant ions to be exposed to only the weaker axial gradient fields and serves the general purpose of minimally disturbing the non ion population that is subject to subsequent m/Z-selective transfers.

As described above, a series of such EGTs can be axially aligned to create an MS(N) molecular detector. In many applications, selective transfer from the last EGT is to the ion detector (e.g., a microchannel plate) and rapid execution of this step an important aspect of the molecular detector's overall effectiveness.

There are multiple ways of dynamically creating an axial gradient field for ion extraction from the excitation region, where the axial gradient field has a spatial symmetry such that the extraction force is felt only by ions with transverse amplitude. For example, in one embodiment, the electrodes can geometry produce a trapping potential in the excitation region near the z-axis as might be found in a conventional quadrupole ion guide or m/Z-selective filter. In this embodiment the electrodes are configured to generate a potential in a region local to the z-axis dominated by the quadrupolar term (1):

$$\Phi(x,y,z)=[U_{DC}+V(t)](x^2-y^2) \quad (1).$$

Methods of applying appropriate DC and RF voltages to the electrodes to generate the potential (1) are known in the art.

Dynamically creating an axial gradient in the trapping field can be managed by segmenting the trapping electrodes in the excitation region along the axial direction and supplying each segment by an independent power supply or adjusting the voltages applied to the segments from a common source by a suitable combination of switches and/or voltage divider circuits. The details of the implementation depend on whether the asserted axial gradient is in the DC component or the RF component of the quadrupolar trapping field. Multiple RF power supplies and high voltage RF switches are expensive components; hence, in presently preferred embodiments, the application of an axial gradient to the DC component is used. The DC can be isolated to a segment and the RF shared among segments by capacitive coupling; however, in this configuration the DC and RF voltage sources should be appropriately isolated. Furthermore, in some embodiments, the DC applied to the segments can derive from a single source with resistors serving to divide the voltage along the segments and therein create an axial gradient in the DC quadrupolar field.

The result, for example, is a DC and/or RF electric field that includes a longitudinal component for ion extraction having the general property that it vanishes on the axis of the trap and increases with displacement along at least one transverse coordinate. For example, for a quadrupolar potential with a linear axial gradient, i.e., $\Phi(x,y,z)=(U+\alpha z)(x^2-y^2)$, one has a solution of the Laplacian with the z component of the electric field $E_z=-\nabla_z\Phi(x,y,z)=-\alpha(x^2-y^2)$ having the desired properties. For the case of segmented DC electrodes, the steps in the DC potential associated with the segmented electrodes are not well described as a linear axial gradient of a quadrupolar potential and numerical representations can be used for modeling the resulting fields. Nonetheless, the resulting axial gradient field can still have the desired properties. In addition, linear axial gradients in hexapole or higher-order fields work analogously and could be used with the same caveat concerning physical step gradients.

Furthermore, in additional embodiments the electrodes can be configured to generate a potential in a region local to the z-axis that is dominated by another quadrupolar term (2):

$$\Phi(x,y,z)=U_{DC}xy+V(t)(x^2-y^2) \quad (2).$$

In this embodiment the linear dynamical system generated by (2) couples the x and y coordinates of the ion's motion. In certain embodiments described further below, the DC component of the field will be generated by electrodes placed along nodal planes of the quadrupolar RF field. Axial segmentation of these electrodes and the application of different DC voltages to the segments will generate the axial gradient fields used in m/Z-selective transfer. Furthermore, axially localized spatial modifications to the RF trapping electrodes can generate the axial gradient fields for imparting a force to off-axis, but not on-axis ions, as described above.

In general, the quadrupole fields in (1) and (2) are examples of a first time-dependent electric field that can transversely confine the ions by generating a time-dependent linear restoring force along the transverse coordinate plane with respect to the longitudinal axis (z) of the form $$\begin{pmatrix} a_{11}(t) & a_{12}(t) \\ a_{21}(t) & a_{22}(t) \end{pmatrix}\begin{pmatrix} x \\ y \end{pmatrix},$$

where x and y denote transverse coordinates, t denotes time, and where $a_{ij}(t)=a_{ij}(t+T)$ for some time interval T.

Ion selection in the EGT is accomplished by resonant transverse excitation and the subsequent transformation of the transverse motion into axial motion by electric potentials that have axial gradients. The resonant transverse excitation is the same as that disclosed in U.S. Pat. No. 7,071,464, incorporated herein by reference. Generally, the trajectory of each of the ions transversely confined by the RF trapping field defines a frequency spectrum for each transverse coordinate and each spectrum comprises at least one spectral peak at a frequency $\omega_{j,(m/Z)}$ that varies with the mass-to-charge ratio m/Z of the confined ion, wherein the index j denotes a particular one of the transverse coordinates. Transversely exciting a selected subset of ions involves generating a time-dependent excitation electric field (typically referred to herein as an AC field) along the transverse coordinate to have spectral intensity at transverse spectral peak frequencies corresponding to the selected range of mass-to-charge ratio.

To maintain highest charge capacity the ions should spread out in axial direction over the full transverse excitation region. Ions with an m/Z near the selected m/Z will also have transverse oscillation amplitudes increased by the resonant excitation ('off-resonant' excitation). Although the full description of the response of an ensemble of charge-coupled ions to the applied excitation field is complex, fields and charge densities are generally established so that at the end of applying the transverse excitation waveform ions of the selected m/Z value have greater transverse oscillation amplitude than ions of unselected m/Z values. After the transverse excitation the axial gradient field is applied to the excitation region of the EGT. The gradient field produces an axial force coupled to the ion's transverse oscillations that accelerates the ion out of the excitation region. To form an m/Z selective gate, a DC potential barrier on the z-axis downstream of the excitation region blocks ions with axial translational energies below a cutoff.

For example, if the transverse to axial coupling was through an axial gradient field spread over the excitation region, then an ion exiting the excitation region will have an axial energy that depends not only on the magnitude and polarization of transverse excitation (desired) but also on its axial position in the excitation region when the gradient field is applied (not desired). The highest axial energies would be associated with ions of the selected m/Z initially located at the entrance end of the excitation region. Ions of the selected m/Z located nearer to the exit end are accelerated for a shorter time and acquire less axial energy. Off-resonantly excited ions will also be distributed in axial energy but with a range decreased in proportion to the reduced transverse oscillation amplitude. Setting the DC potential barrier high enough to block off-resonantly excited ions initially near the entrance end of the excitation region also blocks on-resonantly excited ions initially near the exit end of the excitation region. Accordingly, one exchanges extraction efficiency for selection resolution.

In certain embodiments, the gate is placed outside (downstream) of the excitation region and a limited axial gradient force is used to extract the ions from the excitation region and direct them into the gate region. The gate region has large axial gradients so that the z kinetic energy acquired from the axial gradient field in the gate region dominates; specifically, the position-dependent spread in axial energy from the extraction field is made small compared to the difference in axial energy acquired from the excitation gate between off- and on-resonantly excited ions. Moreover, there can be multiple axially segmented electrodes to generate the axial gradient field and thereby control the position-dependent energy spread.

Furthermore, in certain embodiments, it is preferable to dynamically assert the axial gradient field for ion extraction to the gate region after the transverse excitation so as to minimize the affect of the axial gradient field on the resonant transverse excitation. Specifically, axial gradient fields that couple the axial and radial motion of ions change the transverse resonance frequency of the ions as a function of their axial position. Thus, asserting the axial gradient field in the gate region after the transverse excitation in the linear trap (excitation) region allows the gate and trap regions to be in greater proximity without the gradient field perturbing the ion's resonance frequency during the transverse excitation step.

In preferred embodiments the excitation gate will combine transverse-axial coupling field gradients that are static and dynamic. The static field gradient region is in the oscillatory component of the RF trapping field and is placed before the high resolution selection barrier which is the downstream component of the EGT. The function of the static gradient is high resolution m/Z selection: to further accelerate the axial motion of the ions through transverse/axial coupling and direct the accelerated ions into the high potential barrier (on z-axis) at the exit end of the EGT. The dynamic gate is placed between the excitation region and the static gate. In a preferred embodiment the dynamic gate is composed of an axial gradient in a DC field that is locally (to the z-axis) quadrupolar, followed with a low amplitude potential barrier (on the z-axis). The function of the dynamic gate is to block thermal ions from the region near the static gate where the resonance frequency shifts. The combination of gates results in a greater axial energy incident on the high resolution (exit) potential barrier for a given transverse oscillation amplitude acquired in the excitation region.

Figure 2A:
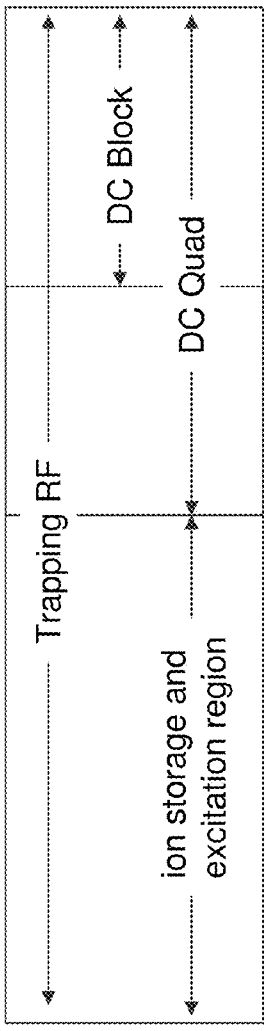
FIGS. 2*a* and 2*b* are schematic diagrams of an embodiment of an excitation gate.
Figure 2B:
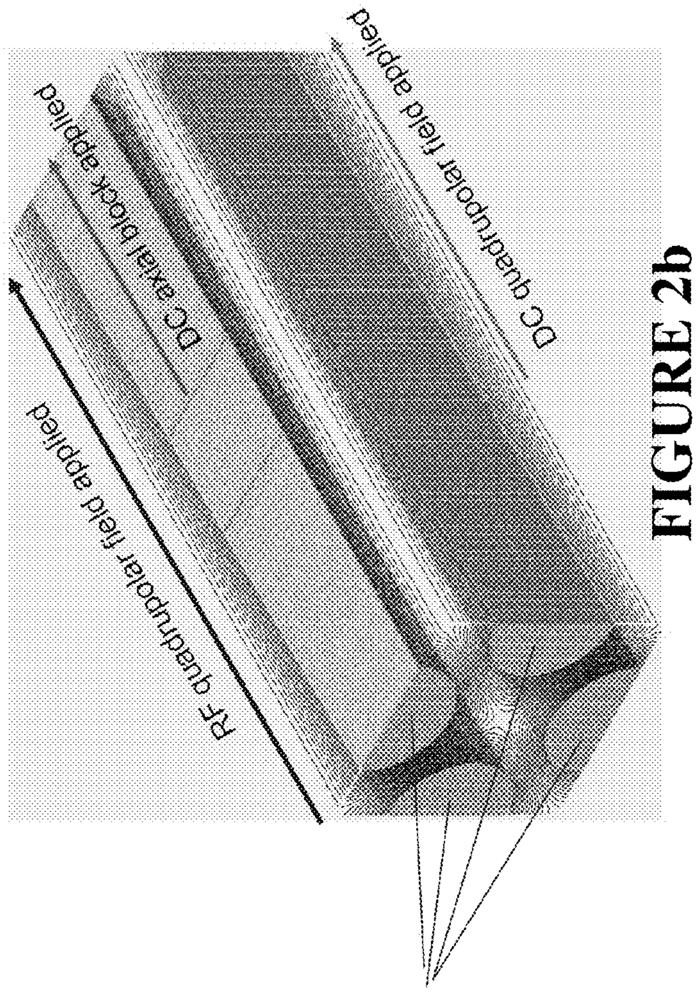

FIGS. 2_a_ and 2_b_ depict one schematic embodiment of an excitation gate 210, which includes an extended RF trapping field, an ion storage and excitation region, a DC quadrupolar region, and an axial DC block region. In the ion storage and excitation region, ions of in a selected m/Z-range are resonantly excited with a transverse excitation field (e.g., a sinusoidal AC field with along at least one transverse coordinate). After the transverse excitation, the DC quadrupole region is energized to transfer the ions of the selected m/Z range toward the DC block. FIG. 2_b_ is a schematic perspective diagram of excitation gate 210 constructed with axially segmented circular electrodes 220 arrayed in a standard quadrupolar geometry. The segmentation of the electrodes permits the generation of potentials to produce the different regions depicted in FIG. 2_a_. FIG. 2_b_ also shows isopotential contours of the RF quadrupolar trapping field.

Figure 3:
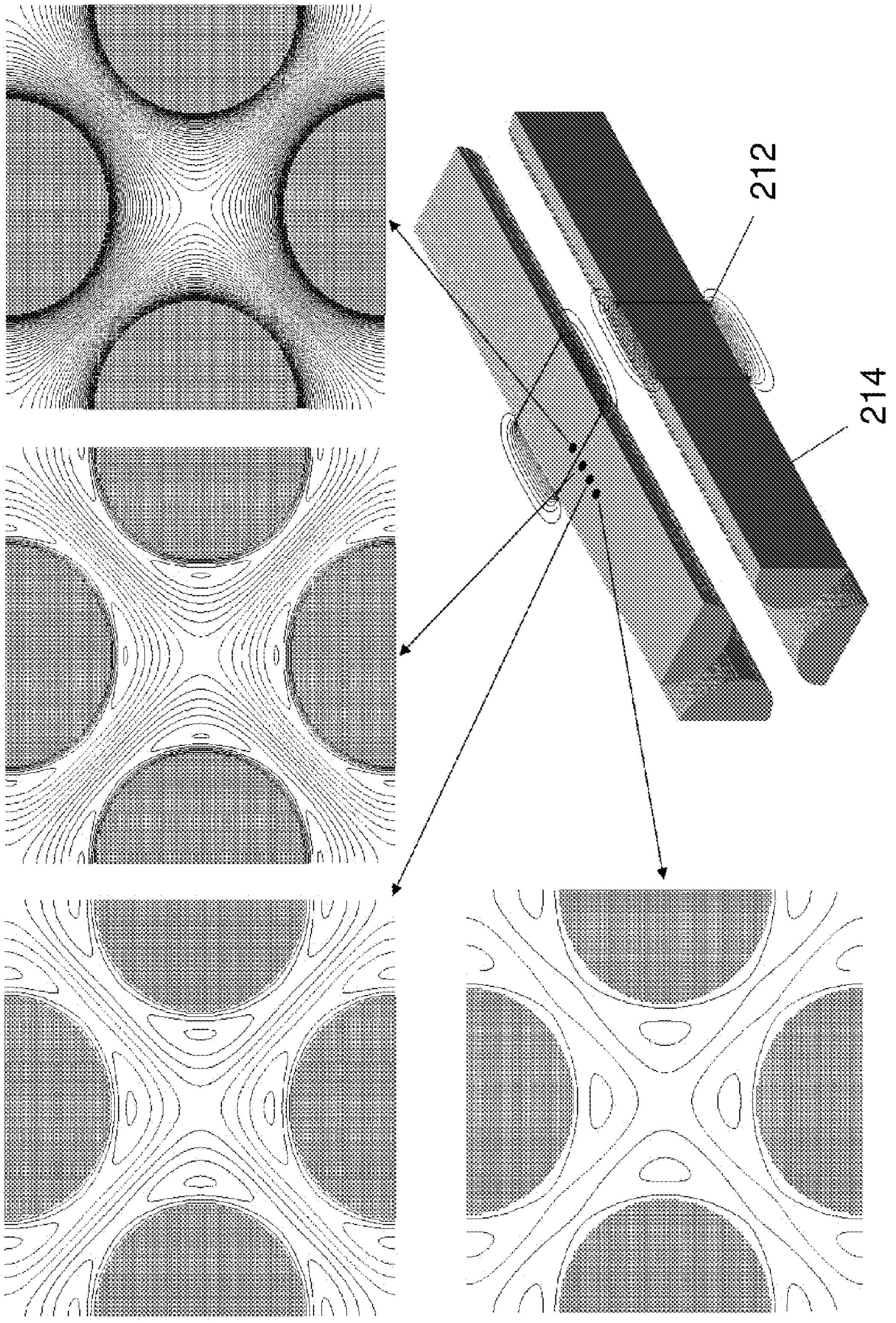
FIG. 3 is a diagram of potential field diagrams for different axial segments of the excitation gate in FIGS. 2*a* and 2*b*.
Figure 4:
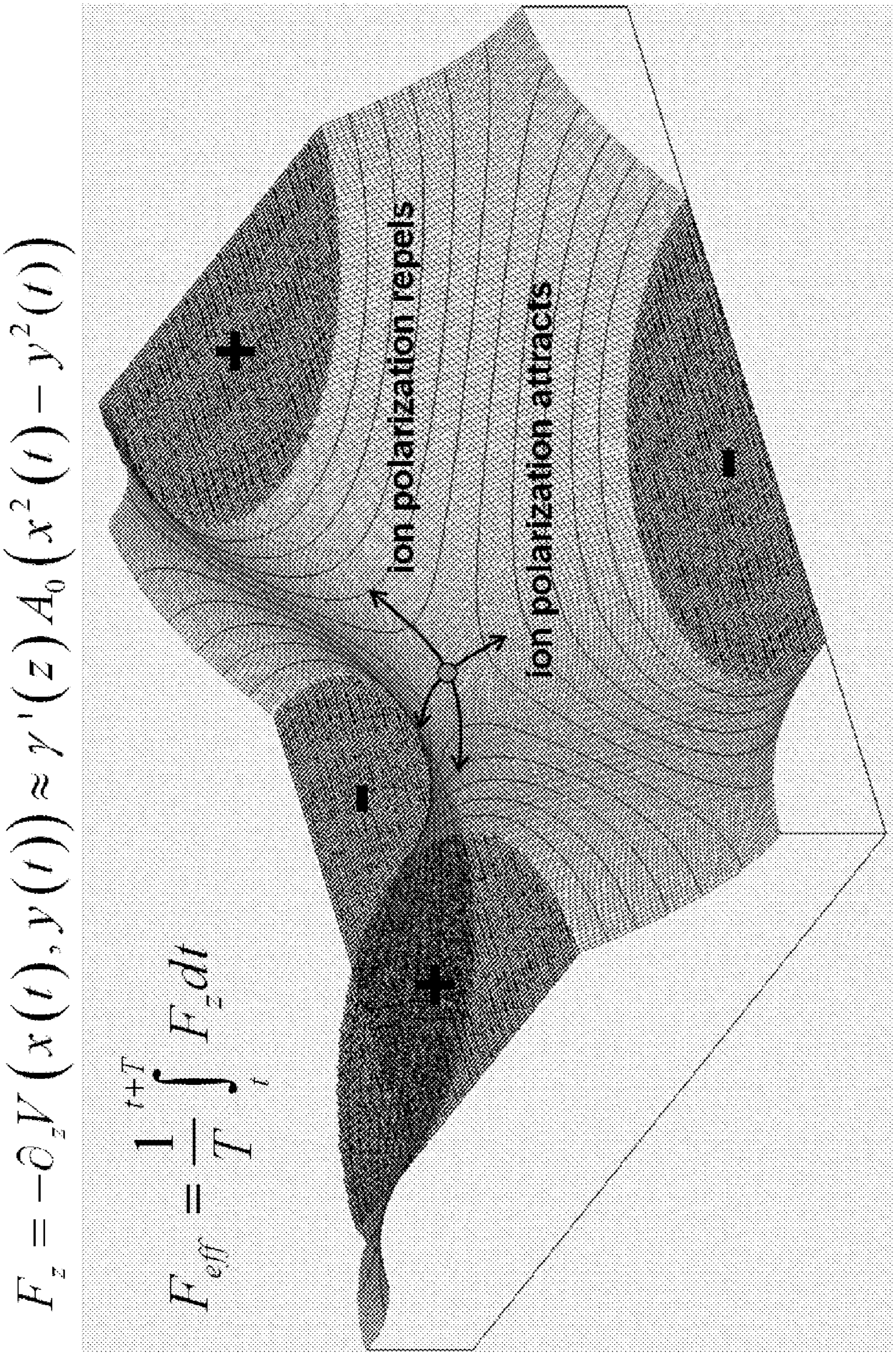
FIG. 4 is a schematic diagram depicting the potential gradients that provide forces to the trapped ions.

FIG. 3 shows a series of cross-sections with potential contours in the axial gradient region associated with applying a DC quadrupolar field to the middle segment 212 of EGT 210. Near the origin the potential retains the qualitative symmetry of a two-dimensional quadrupolar potential but with reduced field amplitude. The effect of the quadrupolar field is to pull the transversely excited ions in region 214 toward the DC block. Moreover, the axial force increases with that transverse excitation. For example, FIG. 4 shows the relation between the ion's motional polarization (relative to the rods) and the axial gradient in the DC quadrupolar field. The ion is assumed positively charged and moving into a region where the DC quadrupolar field is increasing in amplitude as a function of the axial coordinate, z.

Figure 5B:
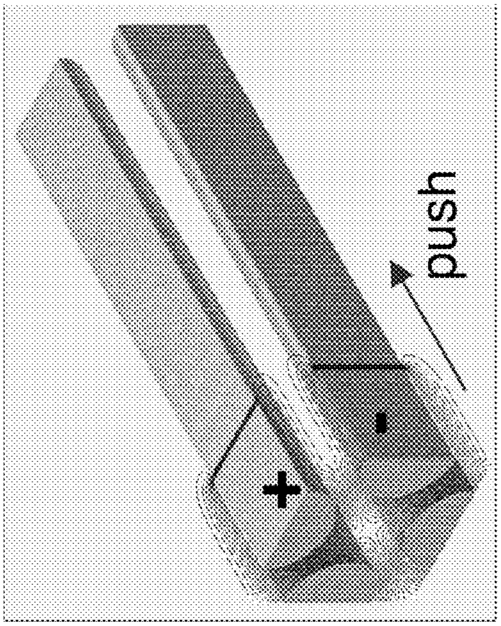
FIGS. 5*a* and 5*b* are schematic diagrams showing how the quadrupole gradient field can be configured to pull or push, respectively, the transversely confined ions.
Figure 5A:
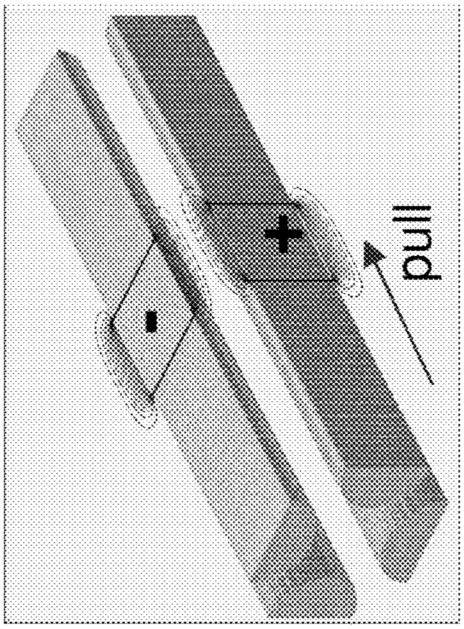

Furthermore, in additional embodiments, a different axial segment of the EGT can be used to produce the quadrupole field to draw the transversely excited ions to the DC block. For example, whereas FIG. 5_a_ shows the axially localized DC quadrupole field pulling the ions towards the DC block, FIG. 5_b_ shows an axially localized DC quadrupole field pushing the ions towards the DC block. Specifically, FIGS. 5_a_ and 5_b_ show the positions and orientations of the DC quadrupolar fields applied after the ions are transversely excited. The axial gradient in the quadrupolar field of FIG. 5_a_ pushes ions with transverse amplitude and proper motional polarization out of the region with a DC quadrupolar field (in the direction of the arrow) while the axial gradient in the quadrupolar field of FIG. 5_b_ pulls ions into the DC quadrupolar field (again, in the direction of the arrow). The difference in the response of the transversely excited ions is due to the difference in orientation of the positive and negative rod pairs relative to the motional polarization of the ions.

Once the transversely excited ions are drawn towards the DC block, there is a second, stronger gradient field to transfer those ions with the largest transverse excitation energy through the DC block. The DC block (also referred to herein as a "potential barrier") is understood to mean a DC bias that is substantially the same on-axis, as off-axis. This DC bias produced a force that uniformly blocks on-axis and off-axis ions from passing through it. However, those ions with large transverse excitation energy are also subject to the off-axis gradient field that couples transverse excitation into an axial force to overcome the DC bias. This is the basis of the EGT disclosed in U.S. Pat. No. 7,071,464. However, as disclosed in the present application, before the stronger gradient field is used to push the selectively excited ions through DC bias, a weaker gradient field with substantially no on-axis force is used after the transverse excitation to transfer the selectively excited ions toward the region on the DC bias. Furthermore, the present application provides additional embodiments for generating the stronger gradient field, such as using a separate DC quadrupolar field and/or geometric modifications to the RF electrodes generating the RF quadrupolar trapping fields.

Figure 6B:
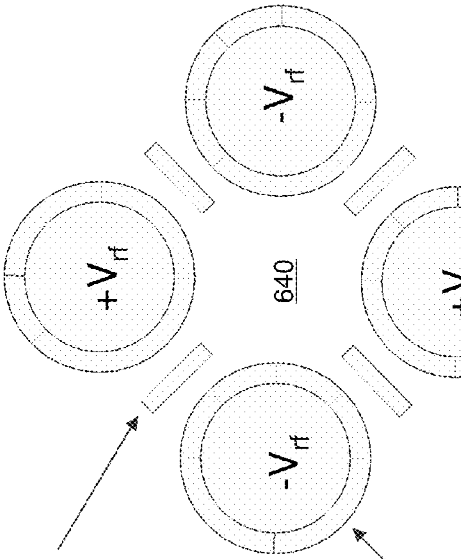
FIGS. 6*a*, 6*b*, and 6*c* are different schematic views of another embodiment of an excitation gate.

Referring now to FIGS. 6_a_, 6_b_, 6_c_, and 6_d_, multiple views of a schematic diagram of another embodiment of an EGT 610 are shown. EGT 610 is formed by four RF electrodes 620 formed in the usual quadrupole configuration to transversely confine ions using an RF trapping field. Interleaved between the RF electrodes are axially segmented plate electrodes 630 for providing AC and DC fields (generally referred to herein as "DC plate electrodes"). Specifically, the plate electrodes bisect the space between the RF electrodes and aligned so as to lie on a zero potential nodal plane between the RF electrodes. FIG. 6_a_ provides a perspective view of the schematic diagram of EGT 610. FIG. 6_b_ provides a cross-sectional view of the different electrodes, including showing the quadrupolar application of the RF voltages ($V_{rf}$) to the different RF electrodes 620. A typical voltage applied to the RF electrode rods is 2 $kV_{0p}$ at a 1 MHz frequency. Ions are transversely confined in the region 640 surrounded by the RF and plate electrodes in FIG. 6*b*.

Figure 6A:
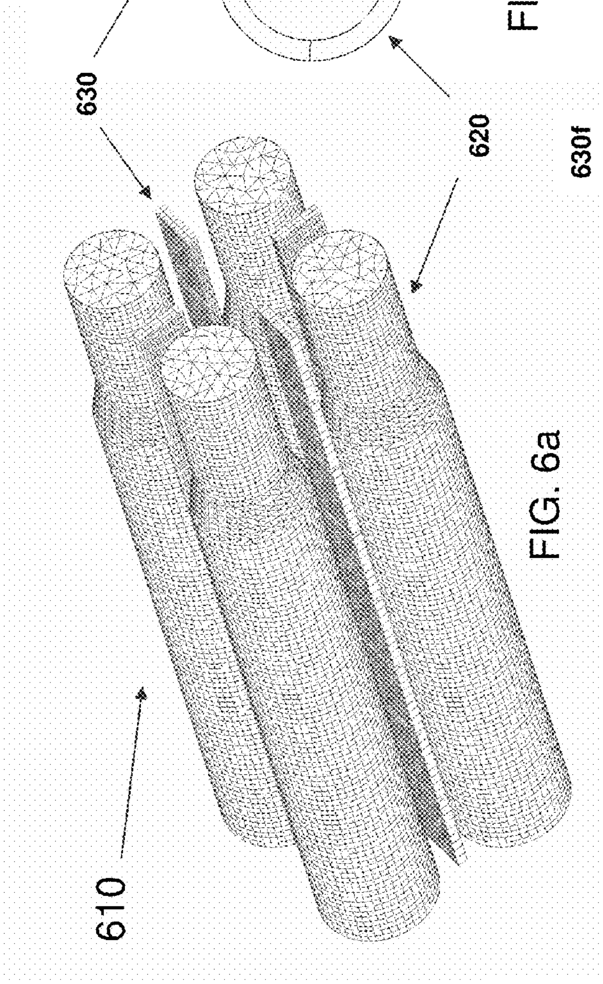
Figure 6C:
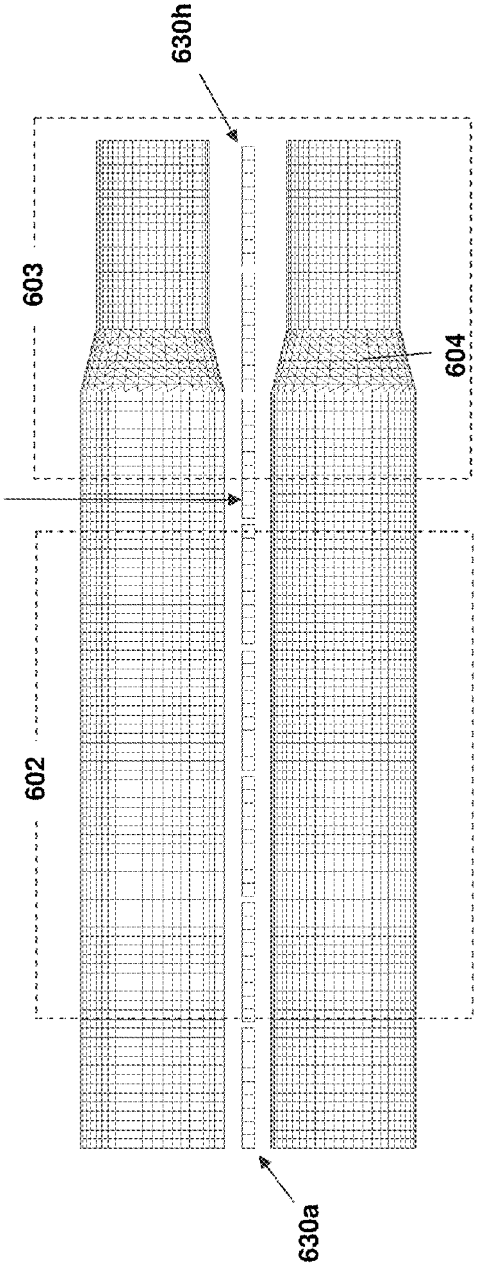

FIG. 6*c* shows a side view of EGT 610. DC bias voltages are applied to the first segment 630*a* and last segment 630*h* of the plate electrodes to axially confine the ions in EGT 610. An intermediate segment 630*f* of the plate electrodes also includes a DC bias voltage to axially separate EGT 610 into a first region 602 for selective transverse excitation of the ions and a second regions 603 for transferring the selectively excited ions through the DC gate formed by plate electrodes 630*h*. As depicted in FIGS. 6*a* and 6*c*, in the region 603, the geometry of RF electrodes is modified. For example, in the depicted embodiment, the diameter of each RF electrode rod is reduced at 605. As a result of the change in geometry, there is an axial gradient in the RF trapping field. This axial gradient couples to transversely excited ions to provide an axial force that is sufficient to overcome the DC gate produced by plate electrode 630*h* for those ions selectively transversely excited based on their m/Z-value in the first region 602.

Figure 7B:
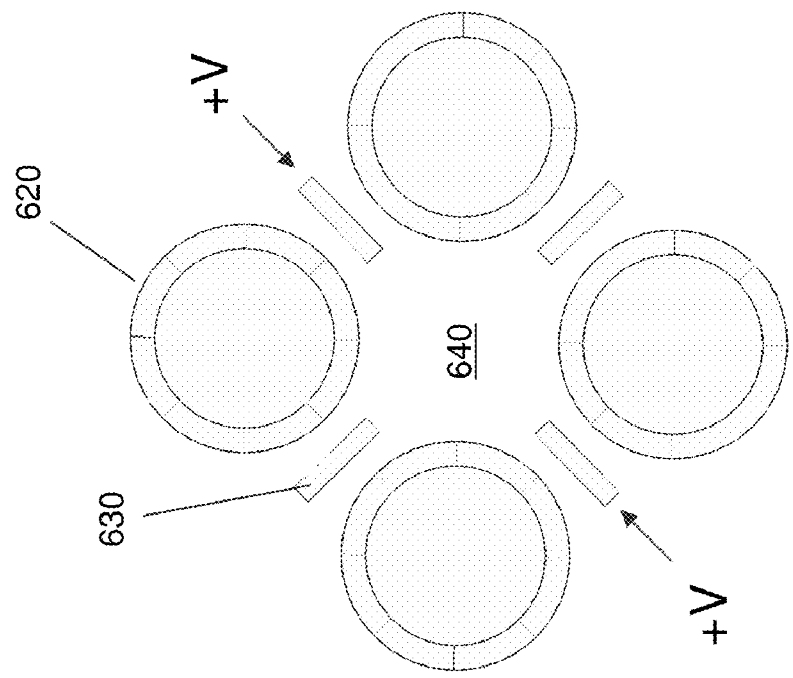
FIGS. 7*a*, 7*b*, and 7*c* show schematic views of different voltages settings applied to the DC plate electrodes in the excitation gate of FIGS. 6*a*-6*c*.
Figure 7A:
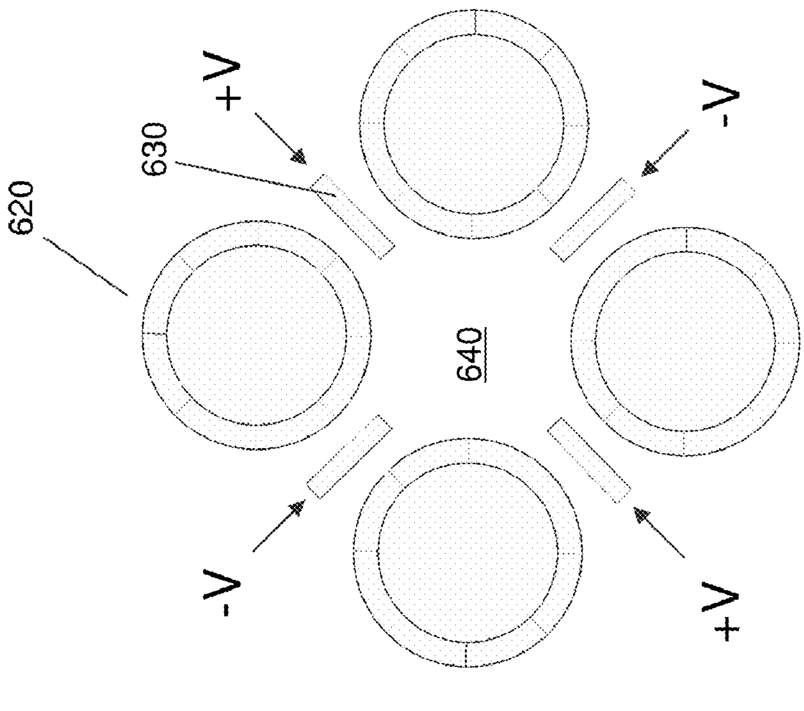
Figure 7C:
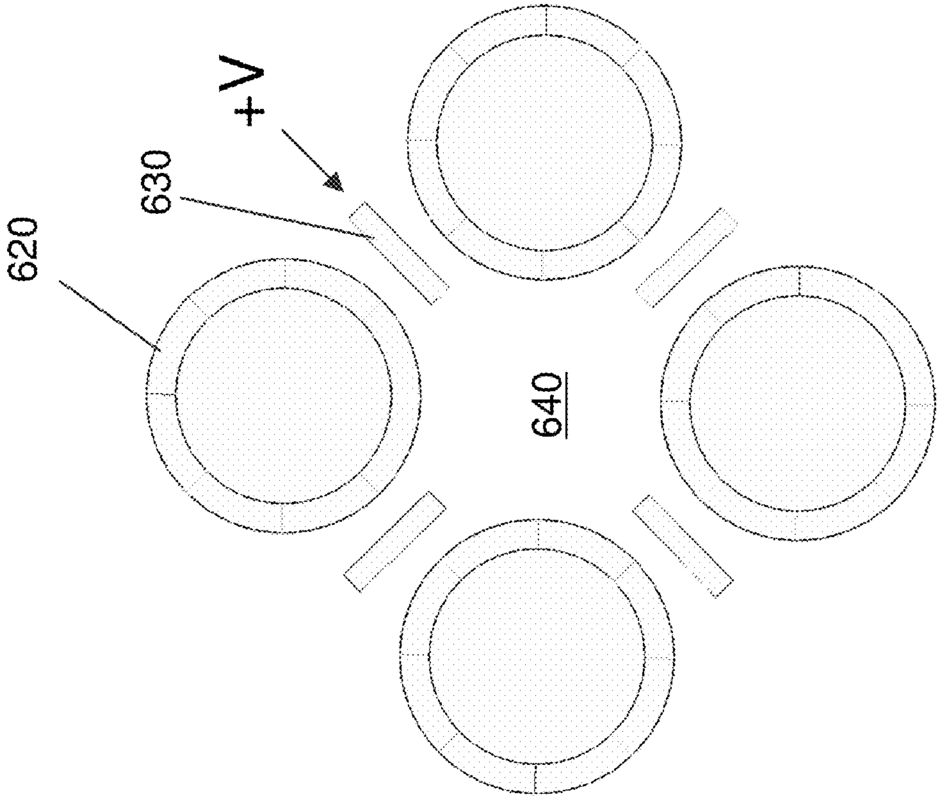

The forces generated by the different axial segments of the plate electrodes depend on individual voltages applied to each plate electrode in each segment. For example, forces can be generated with no on-axis component by applying the voltages to the four plate electrodes symmetrically, such as shown in FIG. 7*a*, in which a positive voltage +V is applied to one pair of oppositely disposed plate electrodes and the minus voltage −V is applied to the other pair of oppositely disposed plate electrodes. The result is a DC quadrupole field. In another example, an on-axis DC field can be generated by applying the same voltage +V to one pair (or both pairs) of the oppositely disposed plate electrodes, as shown in FIG. 7*b*. In another example, an AC voltage can be applied between one pair of oppositely disposed electrodes to provide a transverse excitation force to ions having an m/Z-value resonant with the AC frequency, as schematically depicted in FIG. 7*c*.

Figure 8A:
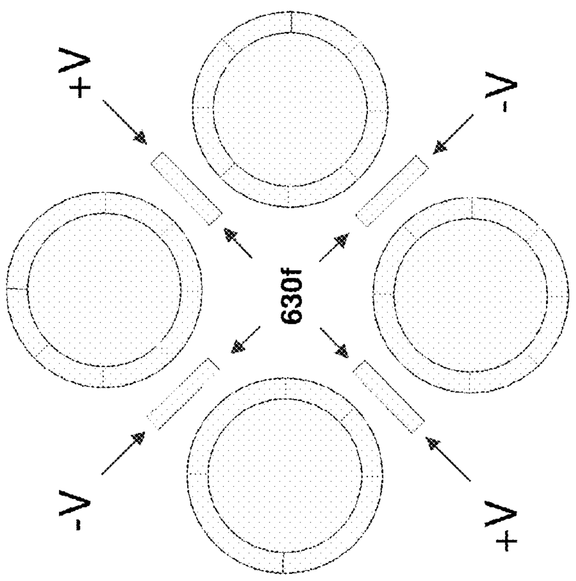
FIGS. 8*a* and 8*b* are schematic diagrams depicting an axially segmented DC quadrupole field being applied to the plate electrodes of the excitation gate of FIGS. 6*a*-6*c*.
Figure 8B:
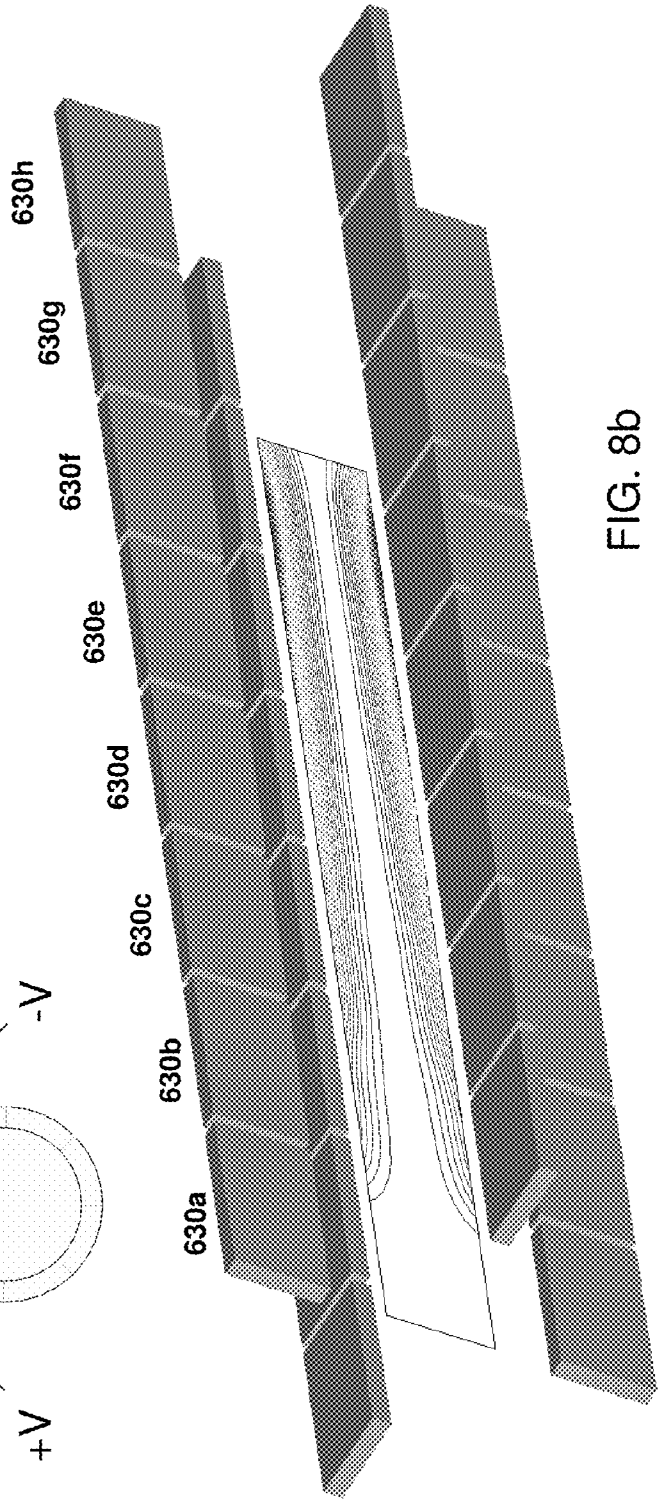

Moreover, by modifying the voltages applied to each segment of the plate electrodes, axial gradient fields can be produced for ion manipulation. For example, FIG. 8*a* depicts a voltage V applied to plate electrodes 630*f* in a DC quadrupole configuration. A similar quadrupole voltage is applied to the electrodes in each of the four preceding axial segments, except the voltage is sequentially reduced (e.g., 0.8V for segment 630*e*, 0.6V for segment 630*d*, 0.4V for segment 630*c*, and 0.2V for segment 630*b*). The resulting field lines are depicted in FIG. 8*b*. As shown there is a quadrupole field with increasing amplitude along the axially direction, i.e., an off-axis DC gradient quadrupole field. Specifically, an ion with transverse energy in the first region of the EGT will feel the off-axis gradient field and experience a force in the direction of the second region of the EGT. Notably, the DC quadrupole voltages applied to the plate electrodes at segment 630*f* can be in addition to the DC block voltages applied to the same electrodes to produce the on-axis DC bias to separate the first regions from the second region.

Figure 9A:
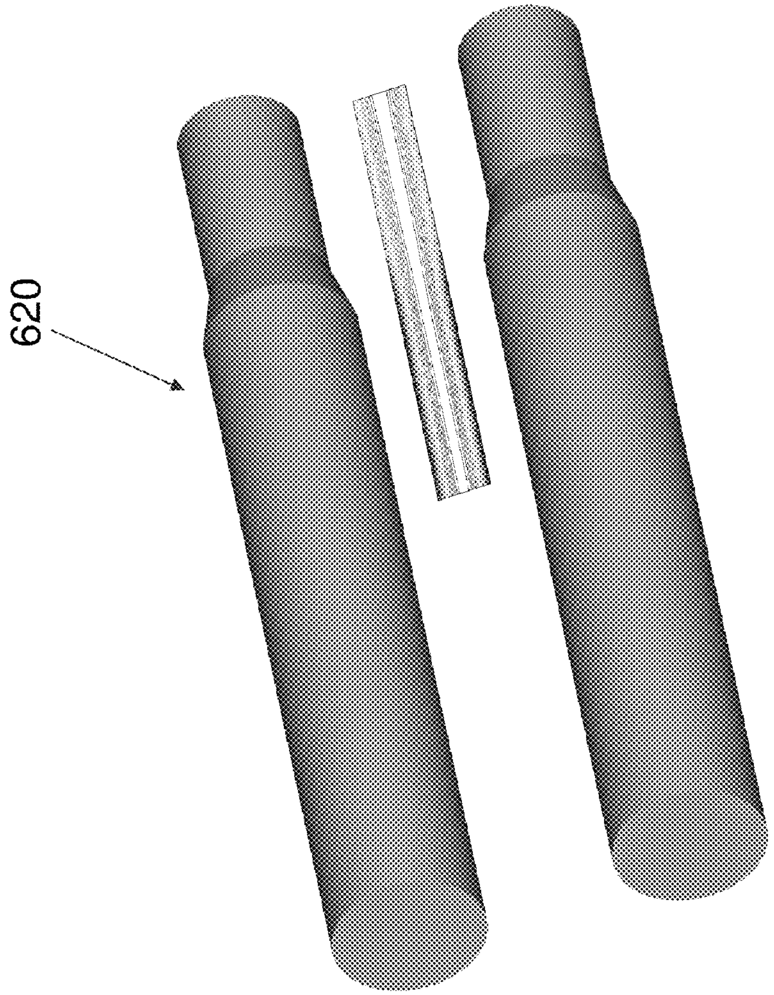
FIGS. 9*a* and 9*b* are schematic diagrams depicting the RF and DC quadrupole gradient fields, respectively, for the excitation gate of FIGS. 6*a*-6*c*.
Figure 9B:
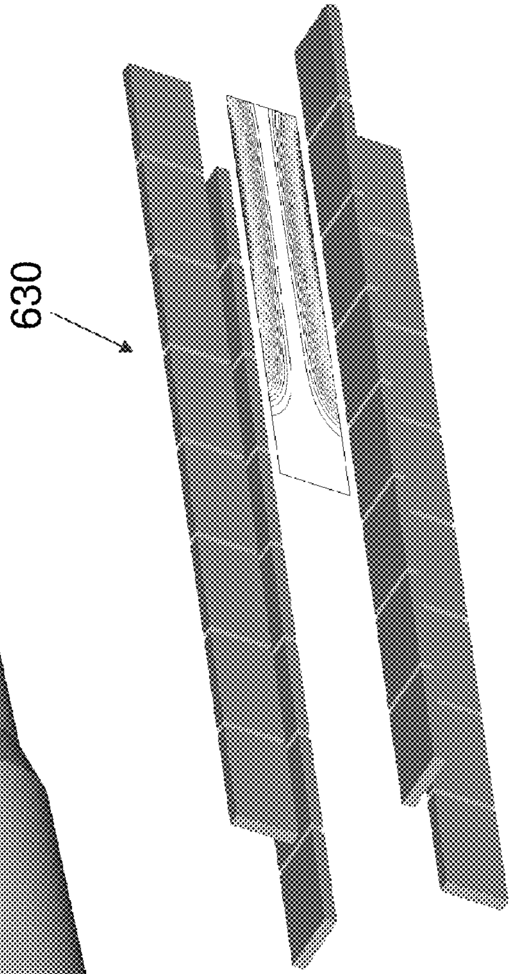

Similarly, the plate electrode segments (630*f* and 630*h*) in the second region of the EGT can also produce an off-axis DC quadrupole gradient field to couple transverse ion energy to an axial force. This second DC quadrupole gradient field can be used to supplement and/or replace to the RF quadrupole gradient field use to transfer selective transversely excited ions out of the EGT through the DC gate at segment 830*h*. For example, RF quadrupole and DC quadrupole gradient fields are depicted in FIGS. 9*a* and 9*b*, respectively.

During operation of EGT 610, ions in the first region 602 are transversely confined by the RF trapping field produced by RF electrodes 620 and axially confined by on-axis DC fields produced by plate electrodes 630*a* and 630*f*. An AC transverse excitation field is then generated by the remaining plate electrodes in the first region. For example, an axially uniform AC voltage is applied to one set of oppositely disposed plate electrodes along segments 630*b*, 630*c*, 630*d*, and 630*e* to transversely excite ions having an m/Z-value resonant with the AC frequency. In other embodiments, a different combination of the plate electrodes can be used, provided that the result is an oscillating AC field that produces transverse excitation for resonant ions.

After the selected ions are transversely excited, the AC field is turned off, and the off-axis DC quadrupole gradient field produced by the plate electrodes in the first region is turned on, the result of which, is to transfer only the resonant or nearly-resonant ions into the second region of EGT. The non-excited ions remain in the first region because there is no on-axis axial force. After the resonant and nearly-resonant ions are transferred to the second region they see a stronger off-axis quadrupole gradient field produced by the geometric modification to the RF electrodes (and, in certain embodiments, a further off-axis DC quadrupole gradient field produced by the plate electrodes in the second region. This stronger off-axis quadrupole field is sufficient to force the resonant ions through the DC block produced by the plate electrodes 830*h*, but not sufficient to force the nearly-resonant ions through the block.

Figure 10B:
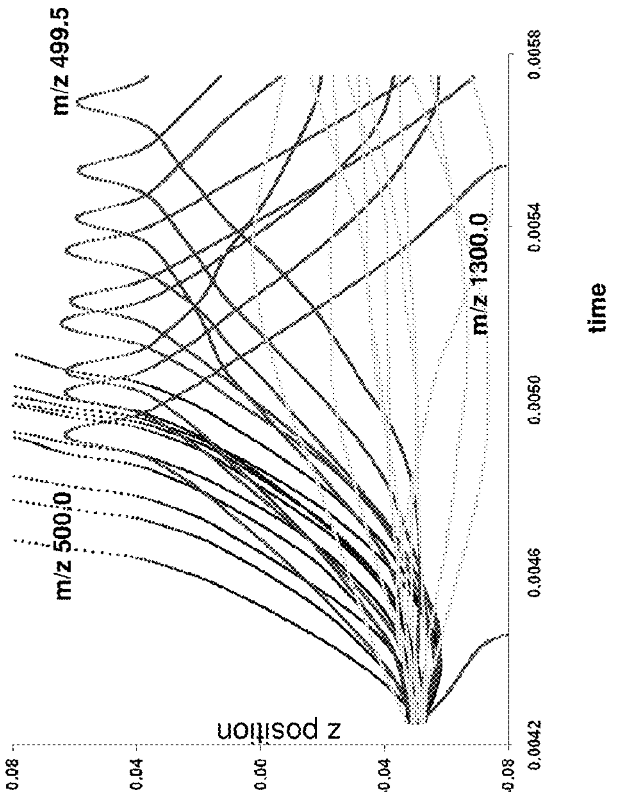
FIGS. 10*a* and 10*b* show the results of a computer simulation for ions excited using the excitation gate depicted in FIGS. 6-9.
Figure 10A:
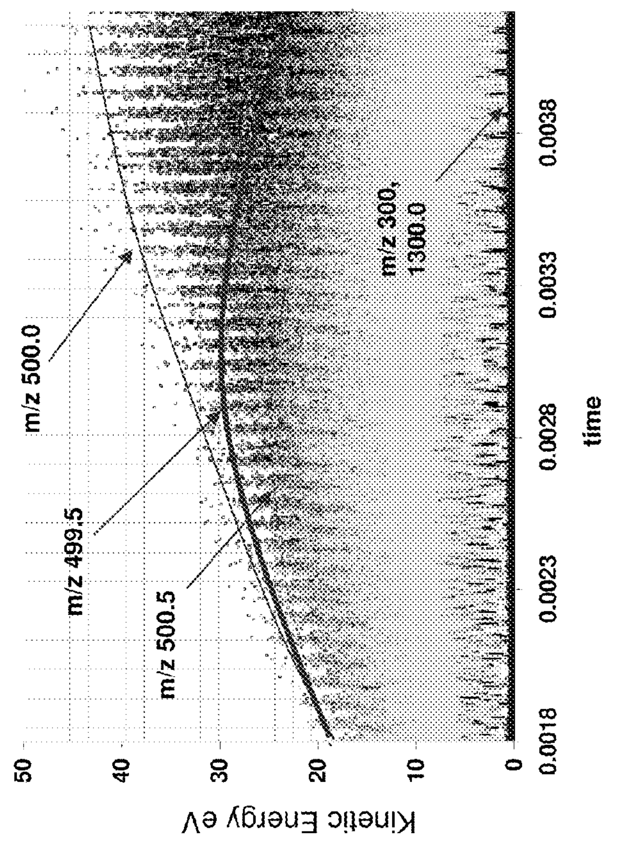

FIGS. 10*a* and 10*b* show the results of a computer simulation for ions excited in this manner. Specifically, FIG. 10*a* plots kinetic energy as a function of time from a computer simulation of single-frequency transverse excitation in an ion cloud consisting of 'on resonant' ions (m/Z 500), 'near resonant' ions (m/Z 499.5, 500.5) and ions far from resonance (m/Z 300, 1300). FIG. 10*b* plots the axial position, z, as a function of time for the selective transfer through the DC block at segment 630*h*. The on-resonant ions (m/Z 500) have the largest transverse oscillation amplitude and acquire enough axial energy from the coupling fields to be ejected. Near-resonant ions (m/Z 499.5) acquire enough axial energy to enter the excitation gate region but not enough to be ejected. The m/Z 1300 ions are far from resonance and do not acquire enough axial energy to penetrate the on-axis DC block between the excitation volume and the excitation gate DC (applied to 630*f* electrodes).

The details of the parameters used to carry out these simulations follow below. The quadrupole rod set in the excitation volume or entrance end of the EGT (region 602, FIG. 6*c*) was characterized by the parallel alignment of circular rods of radii 1.145111 cm and a distance of 1 cm from the center z-axis to the rod surface. The distance from the entrance end to the beginning of the taper in the rods (604, FIG. 6*c*) was 12 cm. The taper region was a linear decrease in rod radii from 1.145111 cm to 0.945111 cm over 1 cm in the z direction. The 0.945111 radii rods then extend for an additional 3 cm in the +z direction. The plate electrodes were aligned with the nodal plane between the rods; they were all 2 mm thick, extend 2 cm in the z direction and 1 cm in radial extension away from the center z-axis, starting with a radial displacement from the z-axis of 1.2 cm. The plates were separated by 1 mm in the z direction. The rods receive +/−2 $kV_{0p}$ at 1 MHz RF in the standard quadrupolar geometry. For the transverse excitation, the ions were first confined to the z region of electrode 630*b* (FIG. 8*b*) by 20 V DC applied to an opposed pair of the bounding electrodes 630*a* and 630*c* (as shown in FIG. 7*b*) and thermally equilibrated by collisions with neutral gas. After equilibration, a 3 V at 141.5 kHz AC signal was applied to one of the four electrodes (as shown in FIG. 7*c*) for 0.5 milliseconds (ms). Maintaining the same phase and frequency, the amplitude of the AC signal was then reduced to 0.75 V and applied for 2.5 ms. After the excitation step, the DC confinement and AC excitation potential were turned off and the transversely excited ions extracted by a ramped quadrupolar DC potential applied to each z segment as shown in FIG. 7*a*. The z region of plates 630*b* had an 8 V amplitude, 630*c* had 16 V, 630*d* had 24 V, 630*e* had 32 V and 630*f* (FIG. 8*b*) had 40 V. The 630*f* plates had an additional 3 V DC applied (FIG. 7*b*) to block thermal ions from the excitation gate region. The 630*g* and 630*h* plates had a 100 V DC quadrupolar potential applied and 630*h* had an additional 12 V DC blocking potential applied in the configuration of FIG. 7*b*. During the excitation and extraction simulation there was a background pressure of 1E-4 Torr He.

Additional embodiments and improvements are also possible. For example, FIGS. 11, 12, and 13 depict three different approaches to the selective extraction using the EGT, using, for example, axially segmented DC electrodes and/or axial modification to the RF electrodes.

Figure 11:
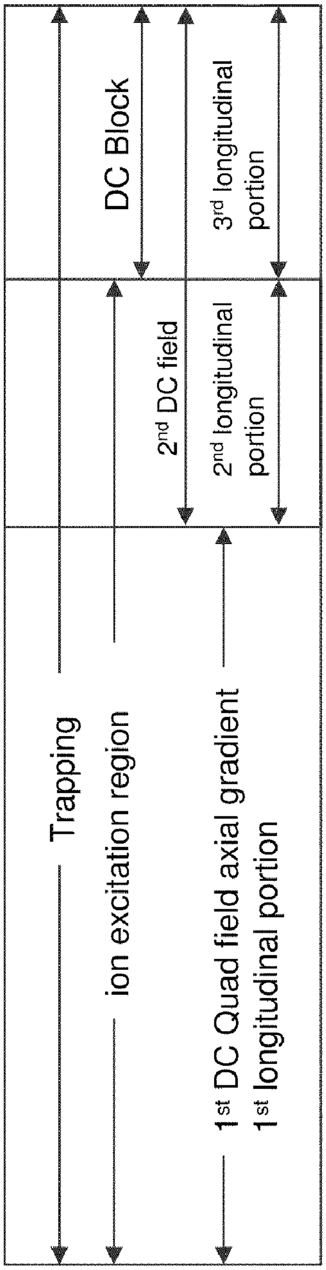
FIG. 11 is a schematic diagram of another embodiment of an excitation gate.

Referring to FIG. 11, a schematic diagram of different regions of an EGT is shown. There is a single DC block (i.e., on-axis DC bias) at the exit end of the second longitudinal portion. The ion excitation region covers the 1st longitudinal portion and a fraction of the 2nd longitudinal portion. There is a soft extraction field (e.g., a first DC quadrupole axial gradient) covering most of the 1st longitudinal portion and a steep quadrupole field gradient entering the 2nd longitudinal portion so that most of the axial momentum for transversely excited ions incident on the DC block arises from moving between the 1st and 2nd longitudinal portion and not from moving across the 1st longitudinal portion.

Figure 12:
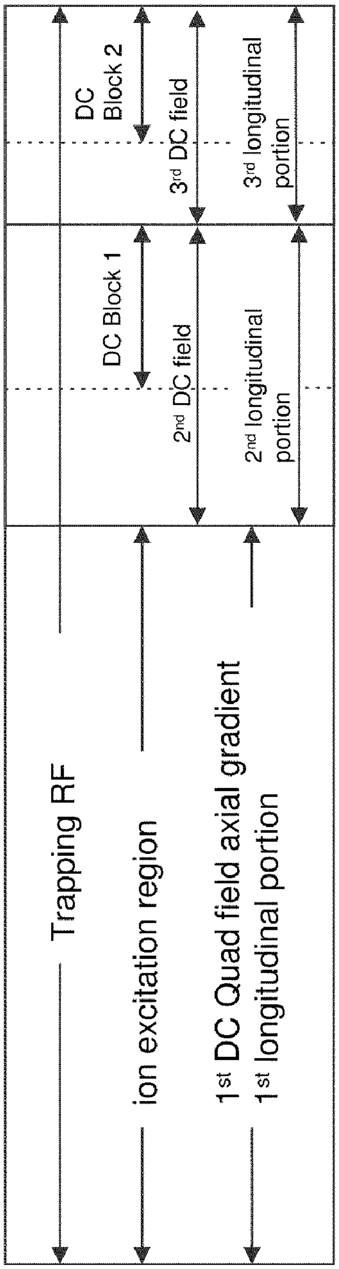
FIG. 12 is a schematic diagram of a further embodiment of an excitation gate.
Figure 13:
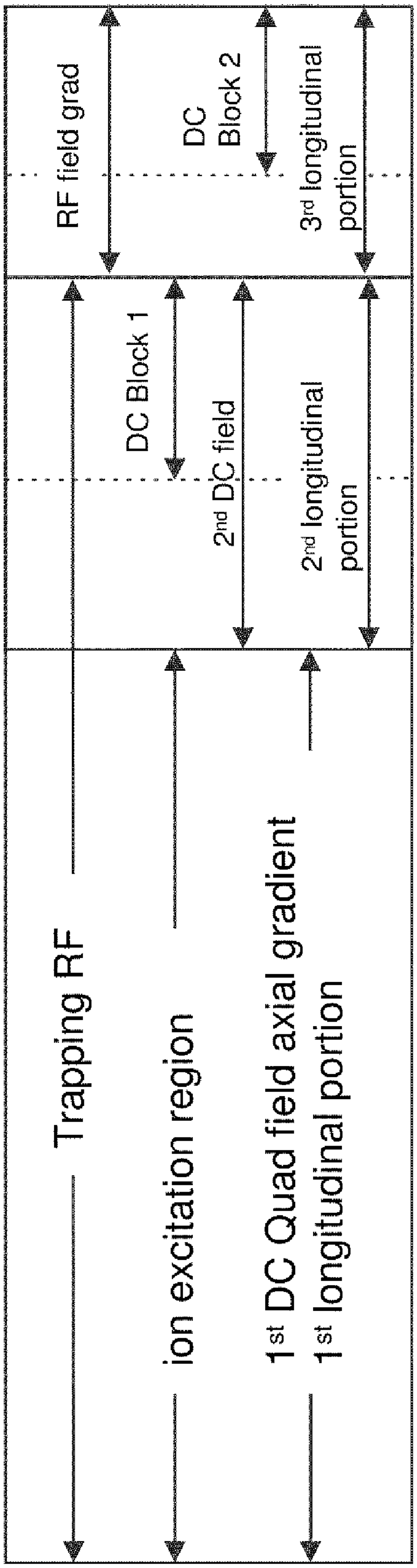
FIG. 13 is a schematic diagram of yet a further embodiment of an excitation gate.

Referring to FIG. 12, a schematic diagram of different regions of another EGT is shown. In this embodiments, there are two DC blocks, one at the exit end of a 2nd longitudinal portion and one at the exit end of a 3rd longitudinal portion. The ion excitation region covers the 1st longitudinal portion. The soft extraction field (1st DC quadrupole axial gradient) is applied to the 1st longitudinal portion. The 2nd DC quadrupole field gradient is configured to pull resonant and near resonant ions through a weak potential barrier (DC Block 1) which blocks the rest (non-resonant) of the trapped ions from the high amplitude 3rd DC field. The 3rd DC field (e.g., a $3^{rd}$ DC quadrupole field gradient) produces the large axial velocity for high resolution selection when used in combination with the higher potential barrier of DC block 2.

This second approach addresses two issues with the approach of FIG. 11. Specifically, in the first approach, one issue is the inability to extract the fraction of the excited ion population that is inside the 2nd DC field region at the time the DC fields are applied. Because these ions do not traverse the full 2nd DC field, they do not acquire the full axial momentum corresponding to their excitation amplitude and therefore they do not cross the DC block; this reduces the extraction efficiency of the device. The second issue is that motional stability in the 2nd DC quadrupole region is restricted to a smaller m/Z range as the amplitude of the DC quadrupolar field becomes large. A large field gradient, leading to a large amplitude field, creates higher axial momentum for an ion with a given transverse oscillation amplitude, and this generally improves the selection resolution. In order to have high selection resolution without losses due to motional instability, the full set of trapped ions must be blocked from the region of high amplitude DC quadrupolar fields (here the 3rd longitudinal portion).

The addition of a first DC block potential and a 2nd DC electric field to pull transversely excited ions that are both on and near resonance through the first DC block isolates the unexcited ion population from the high amplitude 3rd DC electric field. The first DC block potential is low and serves only to prevent thermal ions (non resonant ions) from moving into the 2nd longitudinal portion. The low DC block potential allows a soft 2nd DC extraction (quadrupolar gradient) field and this minimizes the loss of ions through motional instability.

One issue with this second approach, however, is motional instability in the high amplitude DC quadrupolar field of the 3rd longitudinal portion. Although non resonant ions are blocked from this region, the resonant and nearly resonant ions are not. To improve selection resolution one wants to generate the largest possible axial momentum from a given transverse oscillation amplitude. But the use of an axial gradient in the quadrupolar DC field to create this axial force (as in the first and second approach) is limited by motional stability. Orienting the DC quadrupolar field by $\pi/4$ relative to the RF electrodes improves stability (increases the m/Z range that is stable), however, a preferred source of axial acceleration is to create a localized axial gradient in the RF trapping field. The third approach shown in FIG. 13 addresses this.

Referring to FIG. 13, a schematic diagram of different regions of yet another EGT is shown. There are again two DC blocks, one at the exit end of the 2nd longitudinal portion and one at the exit end of the 3rd longitudinal portion. The ion excitation region covers the 1st longitudinal portion and the weak potential barrier DC block 1 keeps the ions confined to the excitation region during the transverse m/Z-selective excitation. As the axial gradient in the RF trapping field will also shift resonance frequencies, it is beneficial to keep ions out of this region during the excitation. After the excitation, the 1st and 2nd DC fields are applied to extract transversely excited ions into the 3rd longitudinal portion. As in the 2nd approach in FIG. 12, the soft extraction field (1st DC quad axial gradient) is applied to the 1st longitudinal portion. The 2nd DC quad field gradient is configured to pull resonant and near resonant ions through a weak potential barrier which blocks the rest (non-resonant) of the trapped ions from the 3rd longitudinal portion. Finally, the axial gradient in the RF trapping field produces the large axial velocity for high resolution selection when used in combination with the higher potential barrier of DC block 2.

Despite the different considerations and issues identified above, each of the approaches described in FIGS. 11-13 are within the scope of the present inventions.

For completeness, it is noted that excitation along the x-y diagonal when the RF electrode pairs are in the standard x, y orientation does not result in oscillatory motion that is confined to the xy-plane. To characterize the ion's trajectory, the motion in a quadrupolar RF field is commonly divided into micromotion and secular motion components (the so-called pseudopotential approximation). The micromotion moves the ion out of the xy diagonal plane while the secular motion component is confined to this plane. This is in contrast to transverse excitation along the x or y directions where the micromotion and the secular motion lie in a single plane.

It is also noted, that the orientation of the DC quadrupole gradient field should be consistent with the transverse excitation. For example, if an electrode configuration is used in which segmented DC electrodes are along the diagonals and RF electrodes on the x- and y-axes, transverse AC excitation produced by one pair of bisecting DC electrodes will couple to the axial force from a DC quadrupolar gradient produced by both pairs of the DC electrodes. On the other hand, if the DC quadrupolar gradient is created by segmenting the RF electrodes and applying DC voltage steps on top of the RF voltage, while still using one pair of the bisecting DC electrodes to create the excitation field so that the transverse secular oscillations are along the diagonal, then the orientations are not consistent and the averaged axial force vanishes.

Furthermore, the axial force associated with an axial gradient in the RF trapping field does not have the same restriction; any transverse oscillation will result in a force into the region of weakened RF. However, the magnitude of this force will depend on the polarization and the optimal arrangement will be to have the transverse excitation rotated $\pi/4$ relative to the RF field.

If a collision cell is located downstream of the EGT, there will generally be a conduction limit between the components to enforce a pressure differential. In this situation, the ion cloud is preferably compressed in the radial dimension after the m/Z-selective transfer to pass through the conduction limit. For example, in the embodiment of FIG. 13, the RF field only weakens in the third longitudinal portion. In another embodiment, however, the region of field weakening could be local. For example, after being accelerated in the region where the RF field is weakening, the selected ions cross the DC potential block and encounter a region of increased RF field amplitude. Here they are pulled through by a coincident DC potential drop. Pulling the ions through a region of increased RF amplitude will compress the radial dimension of the ion cloud so they can pass through a small conduction limit.

Finally, it is noted that in an extended linear ion trap (here the excitation volume), maintaining a sharp resonance frequency for ions distributed over the longitudinal span of the device may require high mechanical tolerance in the alignment of the electrodes. However, a DC quadrupolar field will shift the (secular) resonant frequency of ions. Accordingly, applying calibrated DC voltages to the longitudinally segmented DC electrodes can offset the frequency shift due to mechanical misalignment.

A number of embodiments of the invention have been described. Nevertheless, it will be understood that various modifications may be made without departing from the spirit and scope of the invention. Accordingly, other embodiments are within the scope of the following claims.

What is claimed is:

1. An ion extraction method comprising:

confining ions within an ion trap extending along a longitudinal axis;

exciting a subset of the ions to cause them to oscillate along at least one transverse coordinate;

after the transverse excitation, applying a first field in the region of the transverse excitation to move the excited ions towards one end of the ion trap, wherein the first field is configured to produce an axial force that varies with the amplitude of the transverse oscillation of the excited ions and produces substantially no axial force for unexcited ions located along the longitudinal axis; and providing a second field different from the first field to extract at least some of the excited ions through a potential barrier at the end of the ion trap, wherein the second field is configured to provide an axial force whose magnitude varies with the transverse excitation energy of the excited ions and produces substantially no axial force for unexcited ions located along the longitudinal axis.

2. The method of claim 1, wherein the first field is a DC electric field.

3. The method of claim 1, wherein the second field is a DC electric field.

4. The method of claim 1, wherein the first and second fields are applied at the same time.

5. The method of claim 1, wherein the first field is applied in a first longitudinal portion of the ion trap to move excited ions in the first longitudinal portion of the ion trap toward a second longitudinal portion of the ion trap, and wherein the second field is applied in the second longitudinal portion of the ion trap to transfer ions from the first longitudinal portion through the potential barrier at the end of the ion trap corresponding to a third longitudinal portion of the ion trap.

6. The method of claim 1, wherein the transverse excitation of the excited ions is caused by a transverse excitation field applied in the first region.

7. The method of claim 1, further comprising:

after the transverse excitation, applying a third field to transfer at least some of the excited ions through an intermediate potential barrier in the ion trap to a region of the second field, wherein the third field is configured to provide an axial force whose magnitude varies with the transverse excitation energy of the excited ions and produces substantially no axial force for unexcited ions located along the longitudinal axis.

8. The method of claim 7, wherein the first, second, and third fields are electric fields.

9. The method of claim 8, wherein the first and third fields are DC electric fields applied at the same time.

10. The method of claim 9, wherein the second field is applied at the same time as the first and third fields.

11. The method of claim 10, wherein the second field is a DC electric field.

12. The method of claim 7, wherein the first field is applied in a first longitudinal portion of the ion trap to move excited ions in the first longitudinal portion of the ion trap toward a second longitudinal portion of the ion trap including the intermediate potential barrier, and wherein the third field is applied in the second longitudinal portion of the ion trap to transfer ions from the first longitudinal portion through the intermediate potential barrier in the second longitudinal portion to a third longitudinal portion of the ion trap.

13. The method of claim 12, wherein the second field is applied to transfer ions from the third longitudinal portion through the potential barrier at the end of the ion trap.

14. The method of claim 13, wherein the transverse excitation of the excited ions is caused by a transverse excitation field applied in the first longitudinal region.

15. The method of claim 7, wherein the second field is produced by axially localized spatial modifications to an RF-trapping field used to transversely confine the ions in the ion trap.

16. The method of claim 1, wherein the confined ions have a mass-to-charge ratio within a specified range.

17. The method of claim 1, wherein the confining of the ions comprises generating electric fields within the ion trap.

18. The method of claim 17, wherein the electric fields are produced by a superposition of fields generated by one or more sets of electrodes.

19. The method of claim 18, wherein a first time-dependent electric field transversely confines ions by generating a time-dependent linear restoring force along the transverse coordinate plane with respect to the longitudinal axis (z) of the form $$\begin{pmatrix} a_{11}(t) & a_{12}(t) \\ a_{21}(t) & a_{22}(t) \end{pmatrix} \begin{pmatrix} x \\ y \end{pmatrix},$$

where x and y denote transverse coordinates, t denotes time, and where $a_{ij}(t)=a_{ij}(t+T)$ for some time interval T; and wherein a second DC electric field longitudinally confines ions by producing potential barriers at the entrance and exit ends of the extended ion trap.

20. The method of claim 1, wherein the exciting of the subset of ions comprises generating a time-dependent electric field along the transverse coordinate to resonantly excite confined ions having a selected range of mass-to-charge ratio.

21. The method of claim 20, wherein a trajectory of each of the confined ions defines a frequency spectrum for each transverse coordinate and each spectrum comprises at least one spectral peak at a frequency $\omega_{j,(m/Z)}$ that varies with the mass-to-charge ratio m/Z of the confined ion, wherein the index j denotes a particular one of the transverse coordinates, and wherein the exciting of the subset of ions comprises generating the time-dependent excitation electric field along the transverse coordinate to have spectral intensity at the transverse spectral peak frequency corresponding to the selected range of mass-to-charge ratio.

22. The method of claim 21, wherein the response of the confined ions to the time-dependent electric field comprise a resonant response, wherein ions having a mass-to-charge ratio in the selected range acquire a transverse oscillation magnitude greater than a cutoff value and a non-resonant response, wherein ions having a mass-to-charge ratio away from the selected range acquire an oscillation magnitude that is less than the cutoff value.

23. The method of claim 22, wherein the ions moved by the first field and extracted by the second field comprise ions with the resonant response and not ions the non-resonant response.

24. The method of claim 1, wherein the axial energy of ions incident on the potential barrier at the end of the trap depends on the ion's axial position in the trap at the time the first and second fields are applied, the amplitude of its transverse oscillation at the time the first and second electric fields are applied, and the longitudinal component of the first and second fields in the region containing the ion trajectories.

25. The method of claim 5, wherein the first and second fields are configured so that axial energy acquired by the excited ions moving from first longitudinal portion to the second longitudinal portion is smaller than axial energy that is acquired by these same excited ion moving through the second longitudinal portion of the ion trap.

26. The method of claim 7, wherein the axial energy of ions incident on the intermediate potential barrier depends on the ion's axial position in the trap at the time the first and third fields are applied, the amplitude of its transverse oscillation at the time the first and third electric fields are applied, and the longitudinal component of the first and third fields in the region containing the ion trajectories.

27. The method of claim 12, wherein the first, second, and third fields are configured so that axial energy acquired by the excited ions moving through the first and second longitudinal portions is smaller than axial energy that is acquired by these same excited ion moving through the third longitudinal portion of the ion trap.

28. The method of claim 7, wherein the response of the confined ions to the transverse excitation comprises a resonant response, wherein ions having a mass-to-charge ratio in the selected range acquire a transverse oscillation magnitude greater than a first cutoff value, a nearly resonant response, wherein ions having a mass-to-charge ratio close to the selected range acquire a transverse oscillation magnitude greater than a second cutoff value but less than the first cut-off value, and a non-resonant response, wherein ions having a mass-to-charge ratio away from the selected range acquire an oscillation magnitude that is less than the second cutoff value.

29. The method of claim 28, wherein the first, second, and third fields are configured such that the ions having the resonant response pass through the intermediate potential barrier and the potential barrier at the end of the ion trap, the ions having the nearly resonant response pass through the intermediate potential barrier but not the potential barrier at the end of the ion trap, and the ions having the non-resonant response do not pass through the intermediate potential barrier to even reach the potential barrier at the end of the trap.

30. The method of claim 1, wherein the first field is a DC electric field that has a longitudinal field component that vanishes on the longitudinal axis and increases in magnitude with transverse displacement from the longitudinal axis along at least one transverse direction.

31. The method of claim 30, wherein the longitudinal components of the first DC electric field to axially accelerate the excited ions are applied using DC electrodes.

32. The method of claim 31, wherein the DC electrodes comprise electrodes surrounding the longitudinal axis and alternating with RF electrodes used to generate an extended RF trapping field for transversely confining the ions in the ion trap.

33. The method of claim 32, wherein the DC electrodes comprise electrodes bisecting the space between the RF electrodes and aligned so as to lie on a zero potential nodal plane between the RF electrodes.

34. The method of claim 31, wherein the DC electrodes are segmented along the longitudinal axis for generating a longitudinal component of the electric field.

35. The method of claim 1, wherein the second field is a DC electric field that has a longitudinal field component that vanishes on the longitudinal axis and increases in magnitude with transverse displacement from the longitudinal axis along at least one transverse direction.

36. The method of claim 35, wherein the longitudinal components of the second DC electric field to axially accelerate the excited ions are applied using DC electrodes.

37. The method of claim 36, wherein the DC electrodes comprise electrodes surrounding the longitudinal axis and alternating with RF electrodes used to generate an extended RF trapping field for transversely confining the ions in the ion trap.

38. The method of claim 37, wherein the DC electrodes comprise electrodes bisecting the space between the RF electrodes and aligned so as to lie on a zero potential nodal plane between the RF electrodes.

39. The method of claim 36, wherein the DC electrodes are segmented along the longitudinal axis for generating a longitudinal component of the electric field.

40. The method of claim 7, wherein the third field is a DC electric field that has a longitudinal field component that vanishes on the longitudinal axis and increases in magnitude with transverse displacement from the longitudinal axis along at least one transverse direction.

41. The method of claim 40, wherein the longitudinal components of the third DC electric field to axially accelerate the excited ions are applied using DC electrodes.

42. The method of claim 41, wherein the DC electrodes comprise electrodes surrounding the longitudinal axis and alternating with RF electrodes used to generate an extended RF trapping field for transversely confining the ions in the ion trap.

43. The method of claim 42, wherein the DC electrodes comprise electrodes bisecting the space between the RF electrodes and aligned so as to lie on a zero potential nodal plane between the RF electrodes.

44. The method of claim 41, wherein the DC electrodes are segmented along the longitudinal axis for generating a longitudinal component of the electric field.

45. The method of claim 15, wherein the axially localized spatial modifications to the RF trapping field comprises a localized axial gradient of the RF electric field.

46. The method of claim 15, wherein the longitudinally localized spatial modification comprises a change in geometry of one or more extended RF electrodes used to generate the RF trapping field.

47. The method of claim 46, wherein the RF electrodes comprise rods and the change in geometry comprise a change in the diameter of the rods.

48. The method of claim 47, wherein the change in the diameter of the rods comprises a thinning of the rod diameters in the direction of the potential barrier at the end of the trap.

49. The method of claim 46, wherein the RF electrodes comprise plates and the change in geometry comprises one or more holes in the RF electrodes.

50. The method of claim 1, wherein the ion trap comprises RF electrodes surrounding the longitudinal axis and configured to produce an RF trapping field to transversely confine the ions in the ion trap.

51. The method of claim 50, wherein the ion trap further comprises an extended array of segmented DC plate electrodes that surround the longitudinal axis and alternate with the RF electrodes.

52. An ion trap apparatus comprising:

electrodes configured to generate a trapping field to transversely confine ions with respect to a longitudinal axis and to further generate additional fields for manipulating the confined ions;

a power supply system coupled to the electrodes for generating the fields; and an electronic controller coupled to the power supply system and configured to cause the power supply system to cause the electrodes to:

i) excite a subset of the ions to cause them to oscillate along at least one transverse coordinate;

ii) after the transverse excitation, apply a first field in the region of the transverse excitation to move the excited ions towards one end of the ion trap, wherein the first field is configured to produce an axial force that varies with the amplitude of the transverse oscillation of the excited ions and produces substantially no axial force for unexcited ions located along the longitudinal axis; and iii) provide a second field different from the first field to extract at least some of the excited ions through a potential barrier at the end of the ion trap, wherein the second field is configured to provide an axial force whose magnitude varies with the transverse excitation energy of the excited ions and produces substantially no axial force for unexcited ions located along the longitudinal axis.

53. The apparatus of claim 52, wherein the power supply system comprises a set of power supplies for causing the electrodes to generate AC, DC, and RF fields.

54. The apparatus of claim 52, wherein the electrodes comprise an extended array of segmented plate electrodes alternating with RF electrodes and surrounding the longitudinal axis.

* * * * *